(12) United States Patent
Tang

(10) Patent No.: US 7,807,935 B2
(45) Date of Patent: Oct. 5, 2010

(54) HIGH-FREQUENCY UNINTERRUPTIBLE SIGNAL AND POWER BYPASS

(75) Inventor: Neil H. Tang, Marlboro, NJ (US)

(73) Assignee: Antronix, Inc., Cranbury, NJ (US)

( * ) Notice: Subject to any disclaimer, the term of this patent is extended or adjusted under 35 U.S.C. 154(b) by 573 days.

(21) Appl. No.: 11/977,922

(22) Filed: Oct. 26, 2007

(65) Prior Publication Data

US 2008/0107016 A1      May 8, 2008

Related U.S. Application Data

(60) Provisional application No. 60/856,629, filed on Nov. 3, 2006.

(51) Int. Cl.
*H01P 5/12* (2006.01)
*H01R 13/70* (2006.01)

(52) U.S. Cl. .............. 200/51 R; 333/100; 174/549; 439/579; 725/149

(58) Field of Classification Search .......... 439/579, 439/63, 76.1; 333/100, 101, 127, 128, 24 R, 333/136; 174/50, 52.1; 307/147, 119, 132 M; 455/3, 3.3; 200/51 R, 51.09, 51.1, 50.02, 200/50.1; 725/105, 118, 119, 127, 129, 148, 725/149
See application file for complete search history.

(56) References Cited

U.S. PATENT DOCUMENTS

| | | | |
|---|---|---|---|
| 3,308,420 A | 3/1967 | Fitzgerald | 439/700 |
| 3,416,125 A | 12/1968 | Theve | 439/700 X |
| 3,881,160 A | 4/1975 | Ross | 333/127 X |
| 3,895,318 A | 7/1975 | Ross | 333/136 |
| 4,025,150 A | 5/1977 | Nordberg et al. | 439/218 |
| 4,226,495 A | 10/1980 | Palle et al. | 439/535 |
| 4,281,888 A | 8/1981 | Seaman | 439/824 X |
| 4,755,776 A | 7/1988 | Preschutti | 333/132 X |
| 5,058,198 A | 10/1991 | Rocci et al. | 333/24 X |
| 5,581,134 A | 12/1996 | Romerein et al. | 333/127 R X |
| 5,581,801 A | 12/1996 | Spriester et al. | 455/3.3 |
| 5,648,745 A | 7/1997 | Spriester et al. | 333/24 R X |
| 5,677,578 A | 10/1997 | Tang | 333/127 X |
| 5,756,935 A * | 5/1998 | Balanovsky et al. | 174/549 |
| 5,814,905 A | 9/1998 | Tang | 333/101 X |
| 5,850,165 A | 12/1998 | Spriester et al. | 333/136 X |

(Continued)

*Primary Examiner*—Michael A Friedhofer
(74) *Attorney, Agent, or Firm*—Watov & Kipnes, P.C.; Kenneth Watov

(57) ABSTRACT

High frequency signals and power carried in a main cable delivering the same to a device are insured continuance flow within the main cable through use of a shorting bypass bar assembly in the device that is activated to electrically connect input and output ports of the device whenever the cover of the device is removed for servicing, for insuring continuity of the signal and power flow through the main cable. The shorting bypass bar itself is electrically connected to ground whenever the cover of the device is installed and the shorting bypass bar is disabled. Also, printed circuit board connectors for coupling to the input and output ports of the device to conduct signals from the input port into a PCB board for processing, and for delivering signals and power back into the main cable from another PCB board connector, include RF shielding, and the minimization of the size of the electrically interconnecting components both on the PCB connectors, and on the shorting bypass bar for maintaining a 75 ohm impedance at all times for electrical signals having frequencies ranging from less than to at least 3 GHz.

20 Claims, 33 Drawing Sheets

U.S. PATENT DOCUMENTS

| | | | |
|---|---|---|---|
| 5,892,653 A * | 4/1999 | Nishimuta et al. | 361/643 |
| 5,909,154 A * | 6/1999 | Brown et al. | 333/100 |
| 5,914,863 A * | 6/1999 | Shen | 361/752 |
| 5,920,239 A | 7/1999 | Hardy et al. | 333/100 |
| 6,025,760 A | 2/2000 | Tang | 333/100 |
| 6,074,250 A * | 6/2000 | Tang | 439/579 |
| 6,294,846 B1 * | 9/2001 | Hughes et al. | 307/119 |
| 6,455,788 B2 * | 9/2002 | Hughes et al. | 200/1 R |
| 6,560,778 B1 * | 5/2003 | Hasegawa | 725/149 |
| 6,580,336 B1 * | 6/2003 | Gerszberg et al. | 333/100 |
| 6,593,830 B2 * | 7/2003 | Wu | 333/100 |
| 7,086,078 B1 * | 8/2006 | Gresko et al. | 725/127 |

* cited by examiner

US 7,807,935 B2

HIGH-FREQUENCY UNINTERRUPTIBLE SIGNAL AND POWER BYPASS

RELATED APPLICATION

The invention of the present Application is related to and takes priority from Provisional Application No. 60/856,629, filed on Nov. 3, 2006, for "High-Frequency Uninterruptible Signal And Power Bypass." The teachings of the related Application are incorporated herein by reference to the extent that they do not conflict herewith.

FIELD OF THE INVENTION

The field of the present invention relates generally to cable television signal handling devices, and more specifically to such devices that are capable of handling both AC/DC and RF signals having frequencies ranging from 50 Hz to greater than 3 Gigahertz (GHz), and include a bypass system for insuring continuity of a main cable television signal cable whenever the device must be serviced by removing the electrical or electronic circuitry associated with the device.

SUMMARY OF THE INVENTION

In cable television signal distribution devices including but not limited to multi-taps, for example, shorting bypass bar means are included to provide for continuity in a make before break manner of the main cable signal transmission in the event of removing the signal handling electrical portion of the device for service or replacement. The shorting bypass bar means and associated or opposing portions of the electrical circuitry, with the device in its assembled state, are provided with means for minimizing the capacitive and inductive impedance therebetween to insure capability for handling signals having frequencies as high as or higher than 3 GHz. Ground shielding means are provided for minimizing parasitic affects in order to maintain a 75 ohm impedance to insure the high frequency performance. Also, the electrically conductive shorting bypass bar is designed to insure the maintenance of the 75 ohm impedance throughout, and to minimize any capacitive coupling between the shorting bypass bar and the electrical circuitry of the device.

BRIEF DESCRIPTION OF THE DRAWINGS

Various embodiments of the present invention are described in relation to the drawings, in which like items are identified by the same reference designation, wherein.

DETAILED DESCRIPTION OF THE INVENTION

Figure 25:
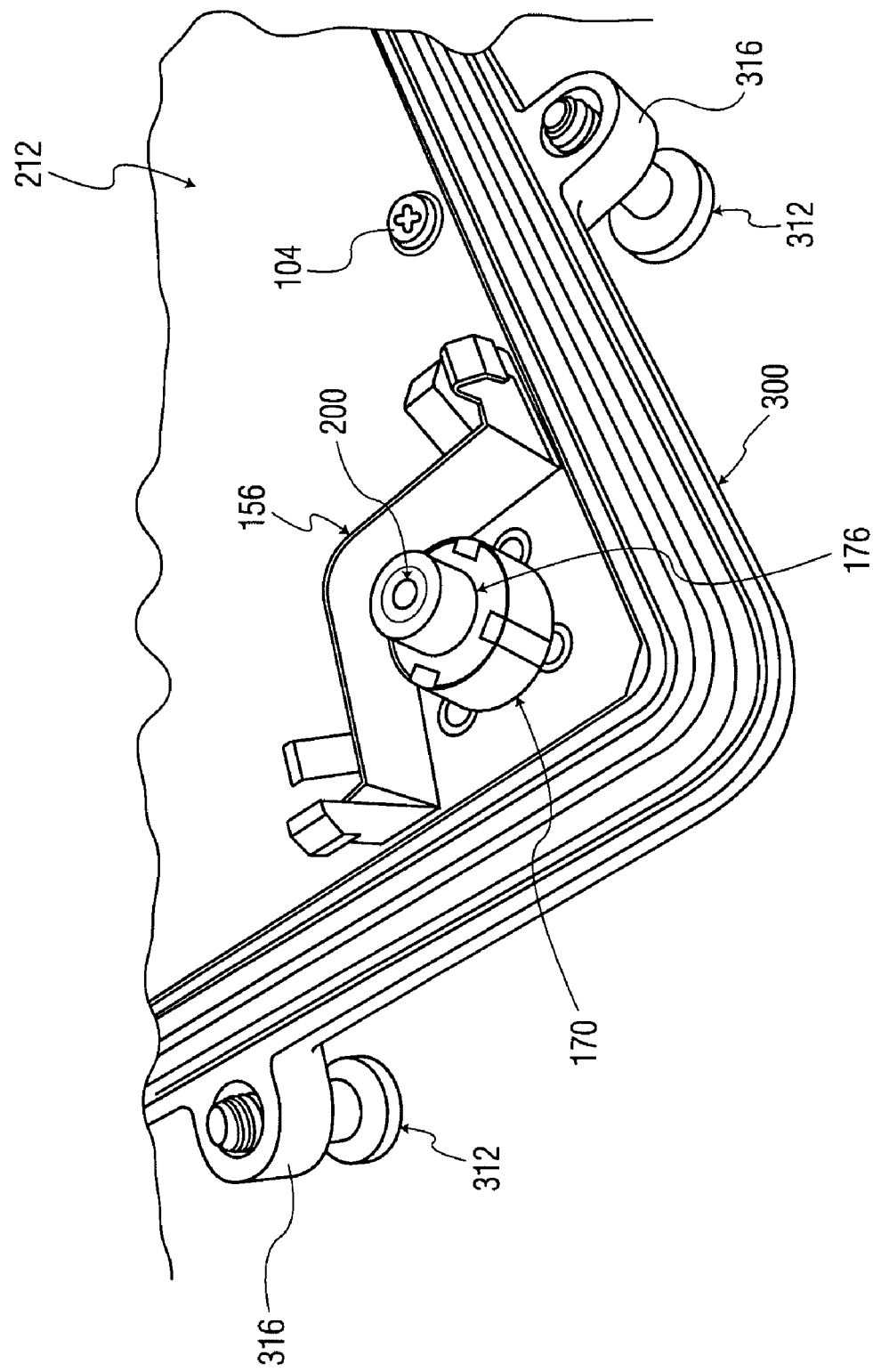
FIG. 25 shows an enlarged pictorial view of the left corner portion of FIG. 24.
Figure 26:
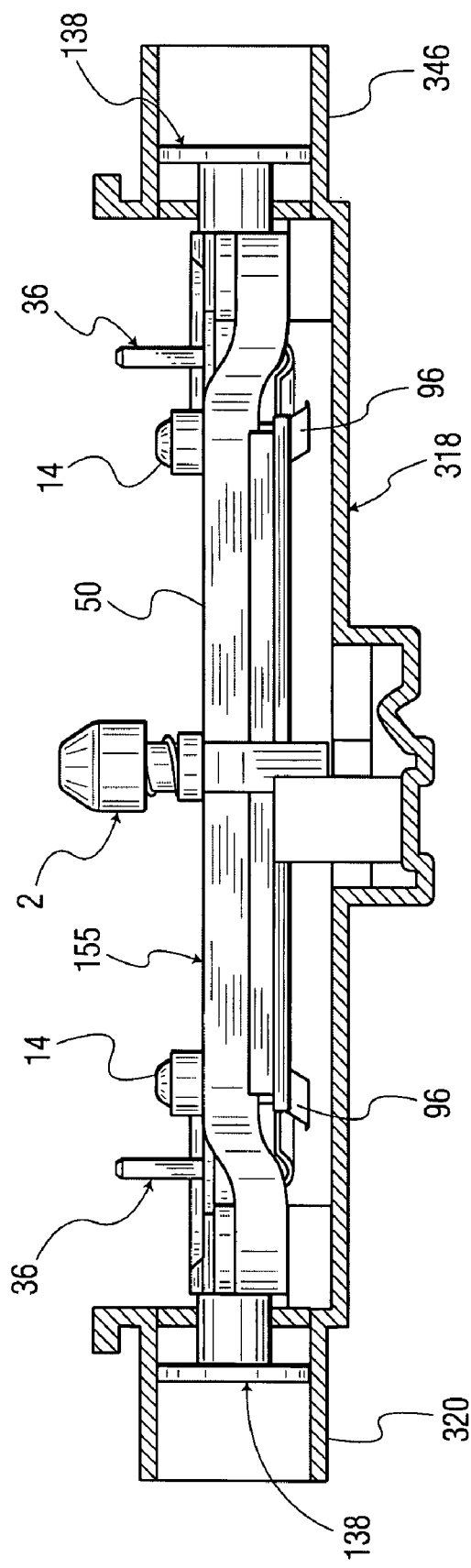
FIG. 26 shows pictorial views looking into the interior portion of the lower section of the housing with the shorting bypass bar assembly installed therein and secured via the screws of FIG. 2A-C.
Figure 27:
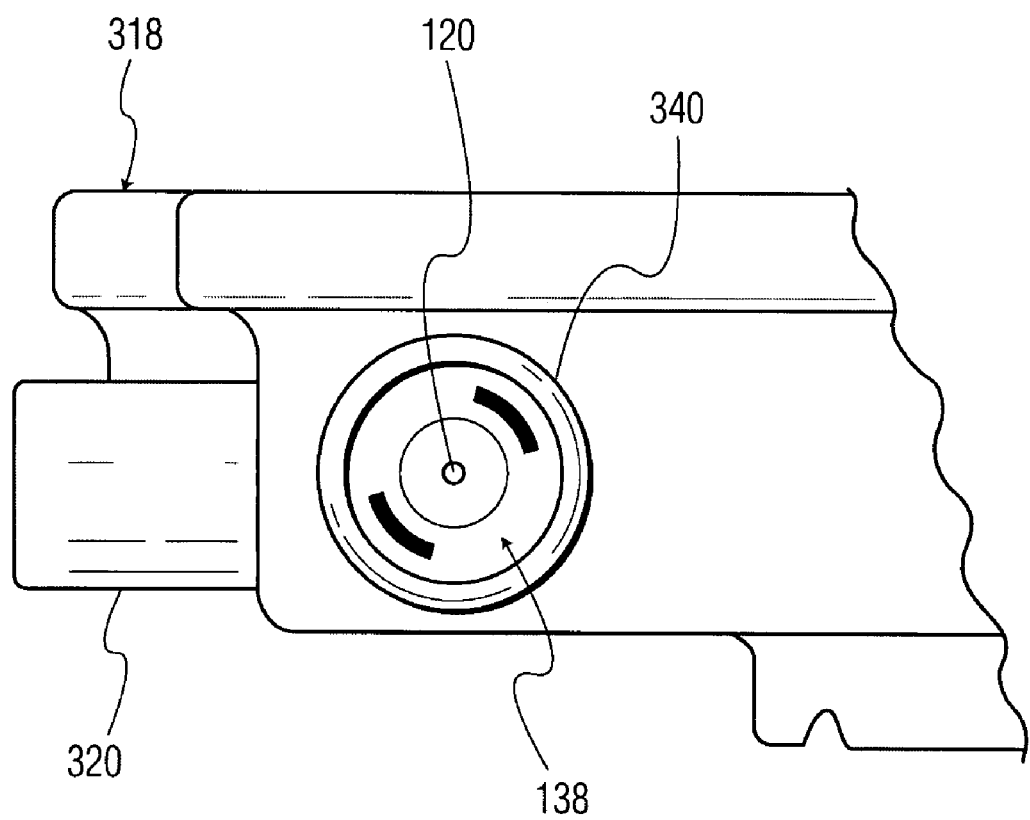
FIG. 27 is a pictorial view looking into the main cable input pedestal port located in the lower or bottom housing section, showing the positioning of the plastic KS stinger pin guide of FIG. 13 therein, with the center located hole thereof partially showing the top end of a female connector portion of a right-angle pin receptacle holder of FIG. 4, whereby a tool can be utilized for removing the stinger pin guide, to permit the pin receptacle holder of FIG. 4 to be rotated 90 degrees to a position centered in the adjacent horizontal port, whereby the tool is used to install the stinger pin guide of FIG. 13 therein, for another embodiment of the invention.
Figure 28:
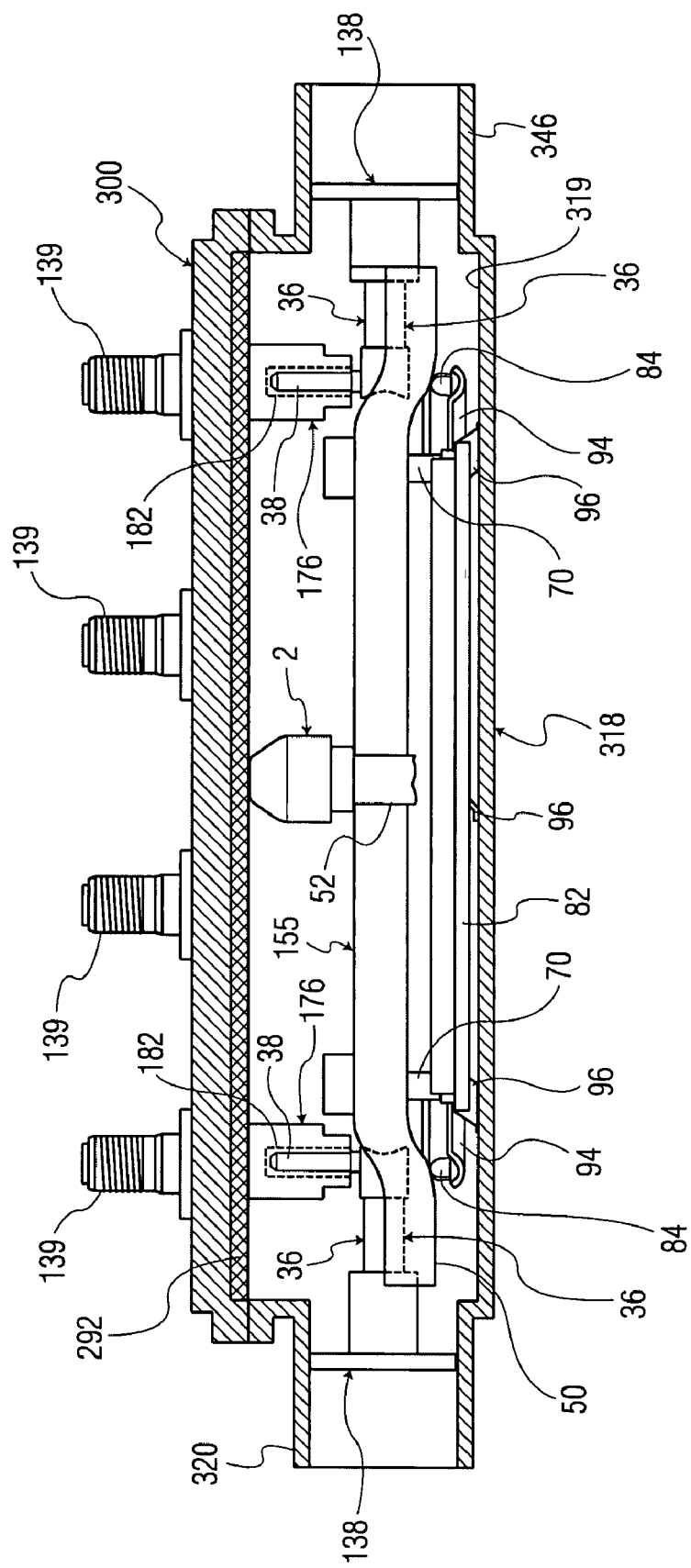
FIG. 28 shows a partial cross section and partial cutaway view of a fully assembled multi-tap, in this example, showing the shorting bypass bar assembly with the shorting bypass bar electrically shorted or connected to the bottom of the bottom housing, and the male pins of the shorting bypass bar assembled assembly plugged into associated female connectors on the printed circuit board mounted inside the removable top housing cover.

FIGS. 1 through 30 show the various components and exploded assembly views for various embodiments and use of the invention. The exploded assembly view of FIG. 14 shows the positioning and installation of the components of FIGS. 1 through 13, respectively. The shorting bypass bar assembly 155 of FIG. 14 is mounted into the inside bottom portion of a lower housing 318 section via screws 14 as shown in FIGS. 26 and 28. Also, note from the latter two figures, in combination with the lower housing pictorial views of FIG. 20, the use of datum points or locating tabs 330, 334 in association with bosses 328 for accepting screws 14, for providing for easy mounting of the shorting bypass bar assembly 155 into the lower housing.

Figure 19:
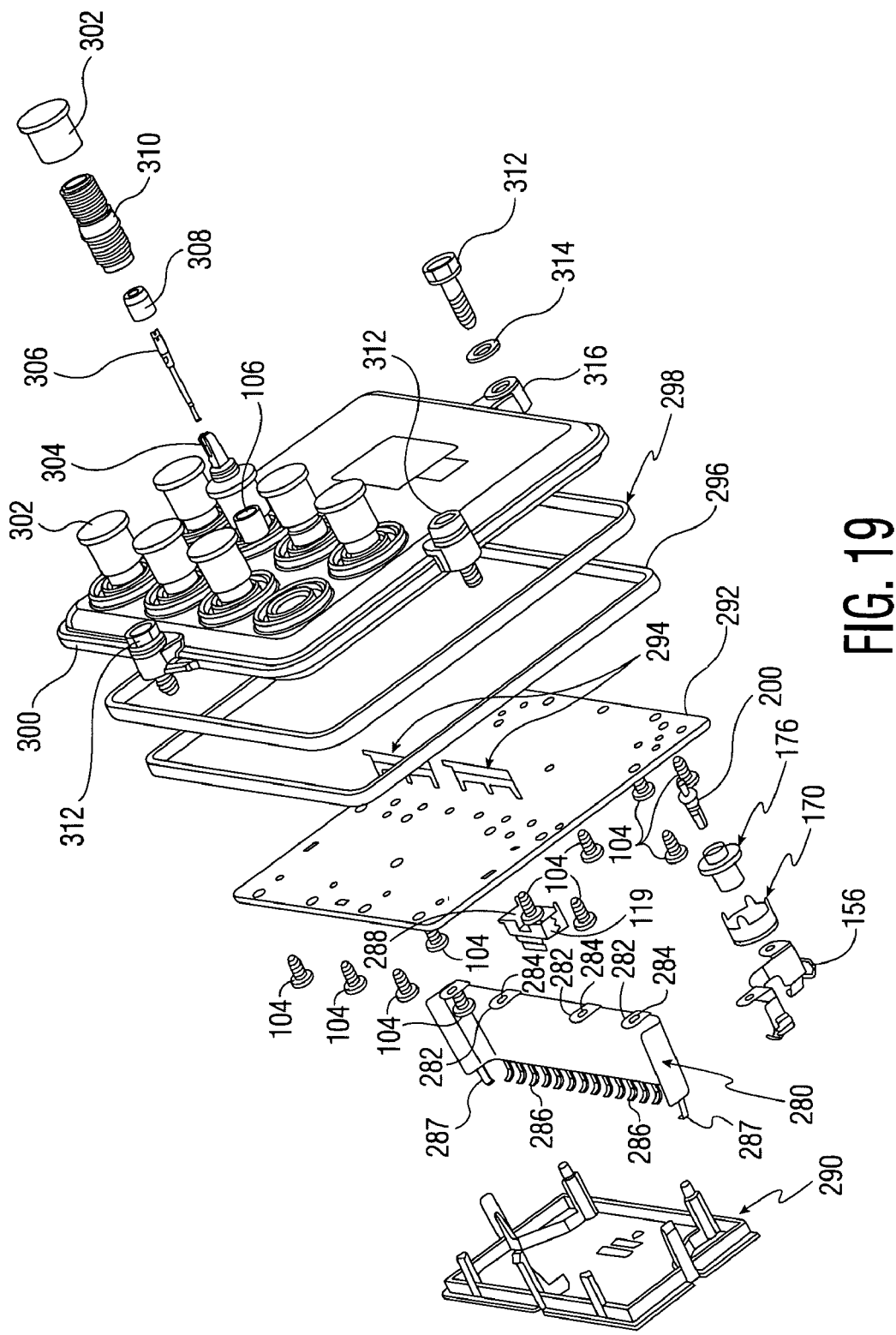
FIG. 19 shows an exploded assembly view of the top casting cover with eight female 75 ohm coaxial cable connectors on the top of the cover, with the bottom of the cover being assembled to a printed circuit board assembly, as shown.
Figure 24:
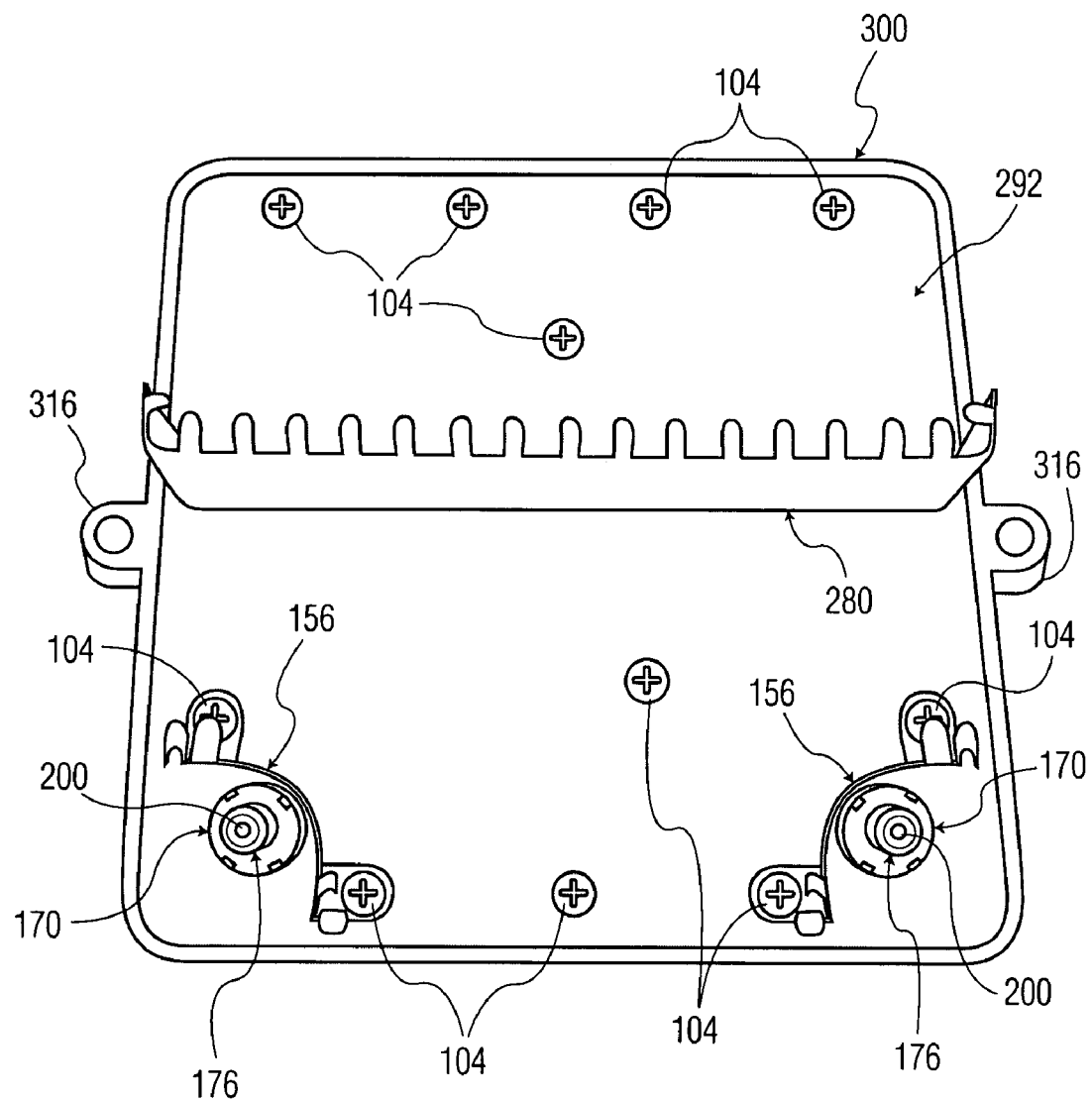
FIG. 24 shows a top pictorial view of the bottom of the top housing cover plate with a printed circuit board attached thereto, showing in the bottom portions proximate the left and right hand corners, the assembly of isolating ground shields of FIG. 15 to the PC board proximate holders for female pin receptacles of FIG. 17, with the latter being surrounded by the ground shields of FIG. 16, as shown, with a center female pin receptacle of FIG. 18 being installed within the center portions of each one of the holders for a female pin receptacle of FIG. 17.

The exploded assembly diagram of FIG. 19 shows the assembly of the top portion of the multi-tap device of this example. However, the present invention is not limited to use in a multi-tap device, and can be used with any device connected within a main cable run, such as in a cable TV system, to insure continuity of the signal down the main cable should the device be taken off-line. Particularly, note the assembly of the isolating ground shield 156 of FIG. 15, the ground shield 170 of FIG. 16, for a 75 ohm female connector assembly, with the holder 176 of FIG. 17 for a female pin receptacle, the latter for receiving the center female pin receptacle 200 of FIG. 18, as shown. FIGS. 24, 25, and 26 clearly show various views of the finalized assembly of a printed circuit board connector assembly, and the positioning of the isolating ground shield 156 relative to the connector assembly. Note that the size of the female seizure connector or holder 176 is optimized to ensure that it in combination with isolator pad or ground shield 156, when installed in the cavity of the housing 318 retains a 75 ohm impedance. In conjunction with this, further note that the connector pin portion, that is the male pin portion 38 of the pin receptacle holder 36 is correspondingly optimized dimensionally for minimizing the capacitive coupling between the PC board connector assembly and the shorting bypass bar 82 of the bypass switch or shorting bypass bar assembly 155, again for insuring a 75 ohm impedance when the multi-tap device of this example is fully assembled.

Figure 1A:
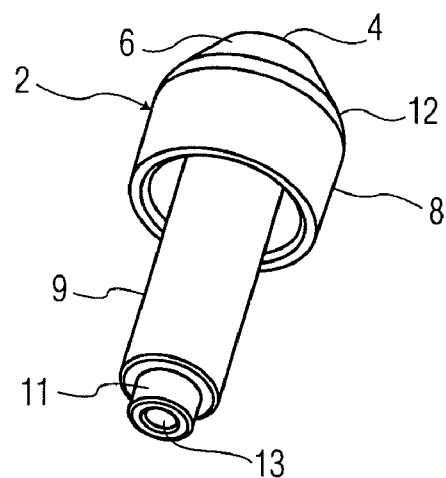
FIGS. 1A through 1C show pictorial, top, and longitudinal cross sectional views, taken along 1C-1C of FIG. 1B, respectively, the latter of a plastic actuator plunger for an embodiment of the invention.
Figure 1B:
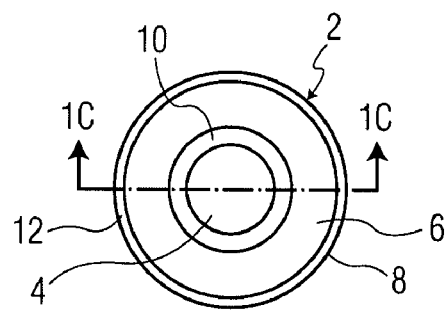
Figure 1C:
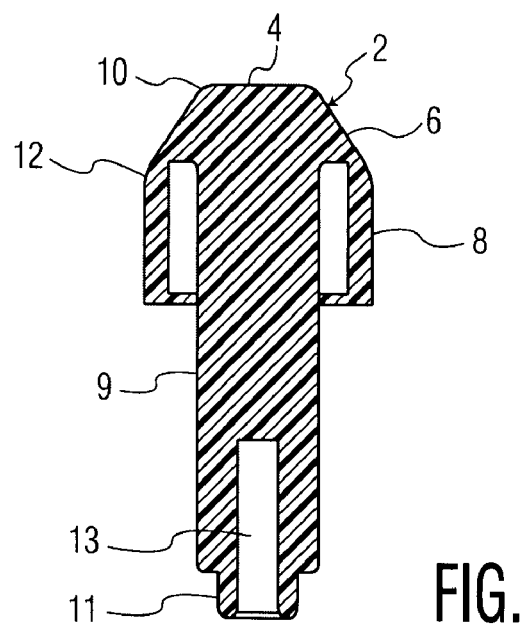

With reference to FIGS. 1A through 13D, individual components of the present bypass switch or shorting bypass bar assembly 155 of FIG. 14 will first be described, before describing the manner of assembling these components. In FIGS. 1A through 1C, actuator plunger 2 includes a flat circular topmost portion 4, on which diverging side portions 6 extend downward to a vertical circular side portion 8. Extending partially within and protruding outward therefrom is a spring mount shaft 9. Note that the top edge 10 of the cap-like flat circular topmost portion 4 has a chamfered top edge 10. The bottommost portion 11 of the spring mount shaft 9 has a reduced diameter relative to the latter, and includes a centrally located screw hole 13, as shown. Also, the diverging side portion 6 of plunger 2 includes a chamfered side edge 12 at the juncture with the vertical circular side portion 8. In one of the embodiment of the actuator plunger 2 consists of a single piece of plastic material. Any suitable plastic material can be used, but it is preferred that the material be polycarbonate, for example.

Figure 2A:
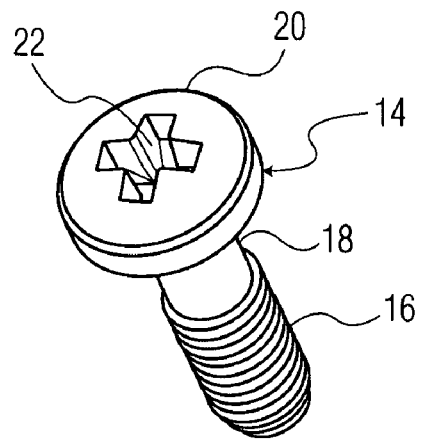
FIGS. 2A through 2C show pictorial, top, and longitudinal cross sectional views, respectively, the latter taken along 2C-2C of FIG. 2B, of a top screw for an embodiment of the invention.
Figure 2B:
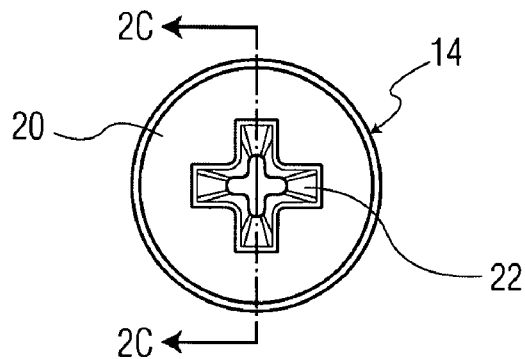
Figure 2C:
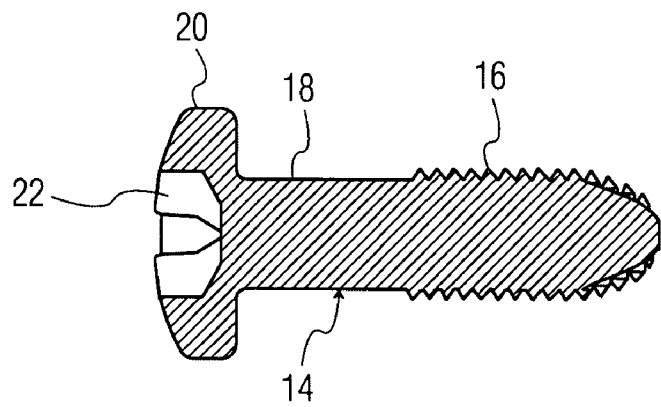

In FIGS. 2A through 2C a self-tapping top screw 14 is shown. Screw 14 includes a lower threaded portion 16, an unthreaded top portion 18 that terminates to the screwhead 20, as shown. In this embodiment, a Philips slot 22 is provided in the central portion of the screw head 20, as shown. The screw 14 can consist of any suitable material, and preferably is made from a suitable metal material such as A3 steel, for example.

Figure 3A:
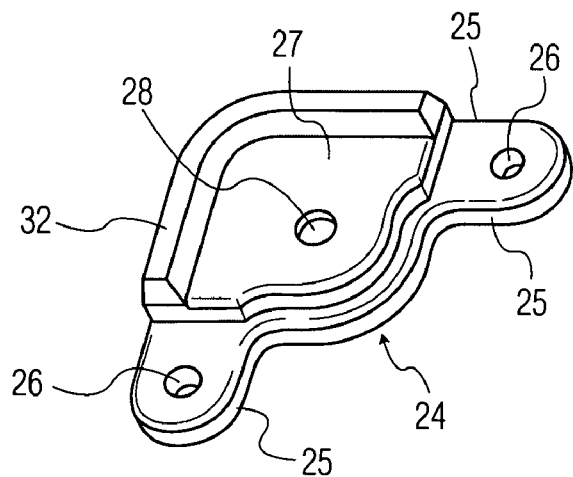
FIGS. 3A, 3B, and 3C show pictorial top, pictorial bottom, and side elevational views, respectively, of a top plastic cover for right and left connector assemblies located on a shorting bypass bar assembly for an embodiment of the invention.
Figure 3B:
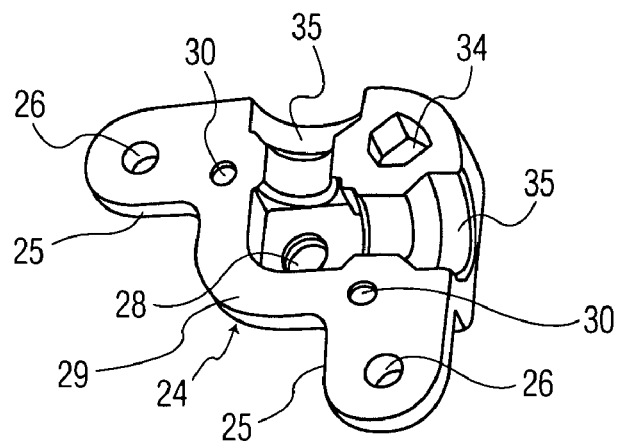
Figure 3C:
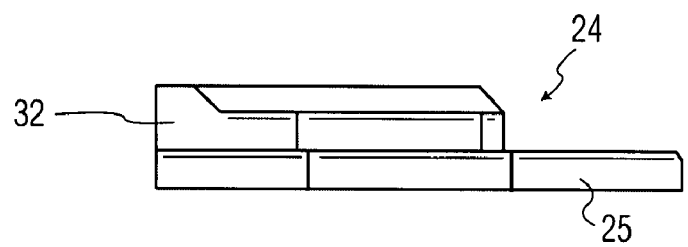
Figure 4A:
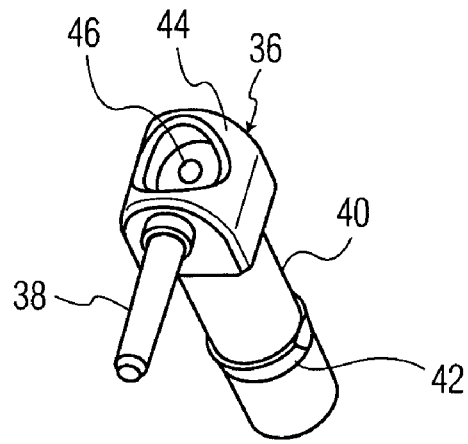
FIGS. 4A through 4E show a pictorial view looking toward a male pin, a pictorial view looking toward a female pin, a back plan view, a right-side elevational view, and a longitudinal cross sectional view taken along 4E-4E of FIG. 4D, respectively, of a right-angle pin receptacle holder for an embodiment of the invention.
Figure 4B:
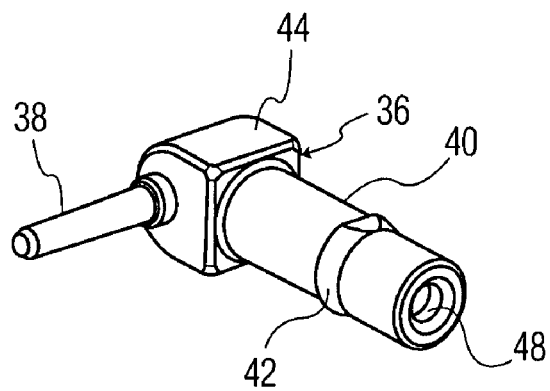
Figure 4C:
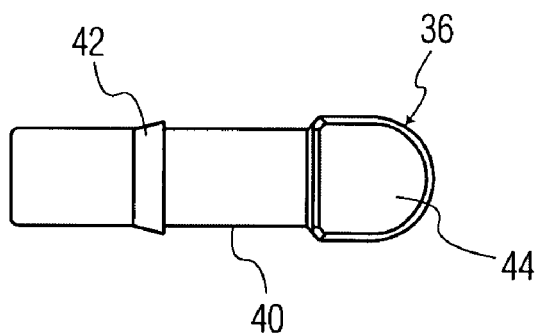
Figure 4D:
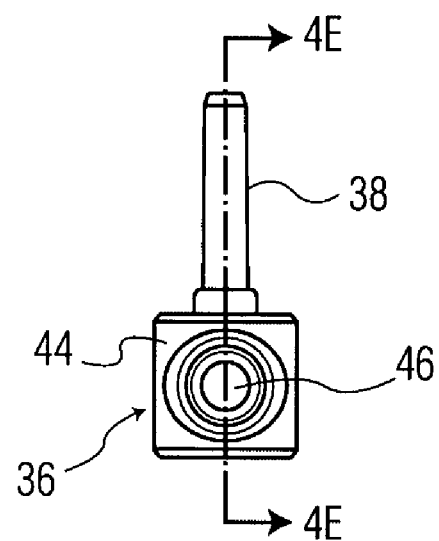
Figure 4E:
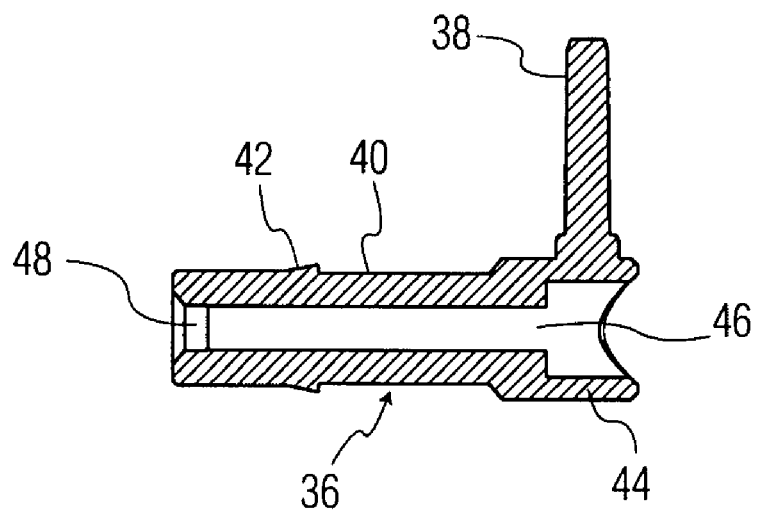

The configuration of the top plastic cover 24 is shown in FIGS. 3A through 3C. As shown, the cover includes two protruding mounting flanges 25 that are offset of 90° from one another, with each including centrally located throughhole 26 for receiving a mounting screw. A top portion 27 located between the mounting flanges 25, and includes a throughhole 28 for receiving the male pin 38 of a right-angle pin receptacle holder 36 (see FIG. 4). A raised arc-like ledge 32 is included in the top portion 27. A bottom portion 29 includes two locating/indexing countersunk holes 30, as shown. A locating or indexing hole 34 is countersunk into the bottom portion 29 and has a six-sided configuration as shown. A pair of identical semicircular cavities 35 at right angles to one another are included in the bottom portion 29, whereby each cavity 35 is configured to receive a portion of the right-angle pin receptacle holder 36 (see FIG. 4). As will be explained below in further detail, the cavities 35 permit the receptacle holder 36 to be actively rotated for securement in one of the cavities 35, depending upon the desired cable orientation. Note that the top cover 24 can be provided from a single piece of suitable plastic material.

In FIGS. 4A through 4E, the design for a right-angle pin receptacle holder 36 is shown. Note that the design to be described is for minimizing electrical capacitance of the holder 36 by minimizing the electrical and physical exposure of the holder 36 to ground. A male pin 38 is provided at right angles to a female connector shell portion 40 via a male/female junction 44. A ferrule 42 is provided around the circumference of the female connector shell portion 40, as shown, to permit retention thereon via snap-on to the cylindrical portion of a KS stinger pin guide 138 (see FIGS. 13A-13D). The female pin entry hole 46 is provided at one end of the junction 44, as shown. A centrally located male pin entry hole 48 is provided in the front end of the female connector shell 40. The right-angle pin receptacle holder 36 can consist of a single piece of suitable electrically conductive metal material, and preferably consists of zinc diecast. Note that as will be described in detail below, the male pin 38 is configured for plugging into a female pin receptacle 200 located on a printed circuit board 292 (see FIG. 19), in this example.

Figure 5A:
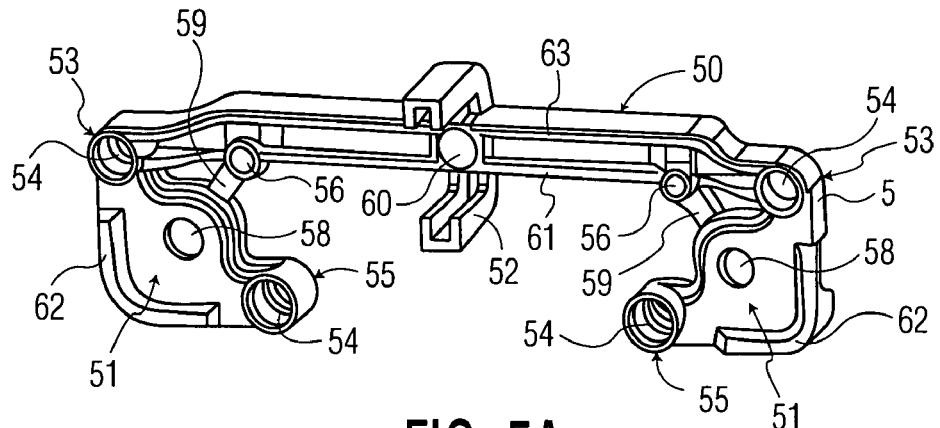
FIGS. 5A through 5F show a bottom pictorial view, a top pictorial view, a top plan view, a longitudinal cross sectional view taken along 5D-5D of FIG. 5C, a lateral longitudinal cross sectional view taken along 5E-5E of FIG. 5C, and a bottom plan view, respectively, of a cross member for a shorting bypass bar assembly consisting of a dielectric material, such as plastic, for an embodiment of the invention.
Figure 5B:
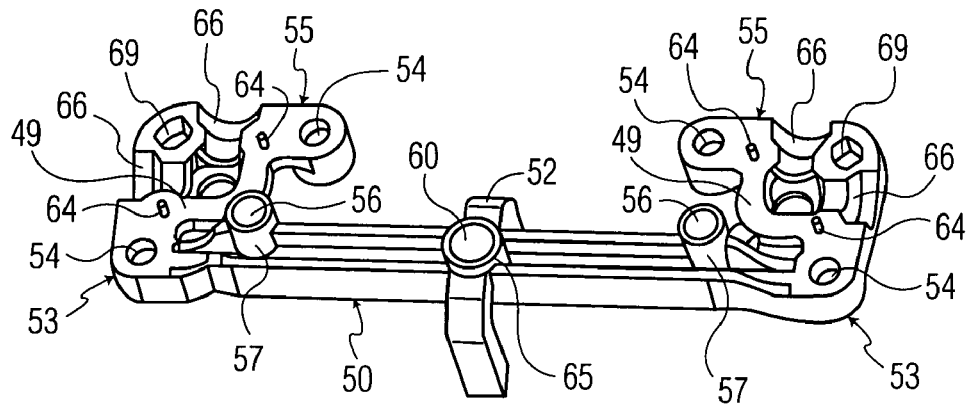
Figure 5C:
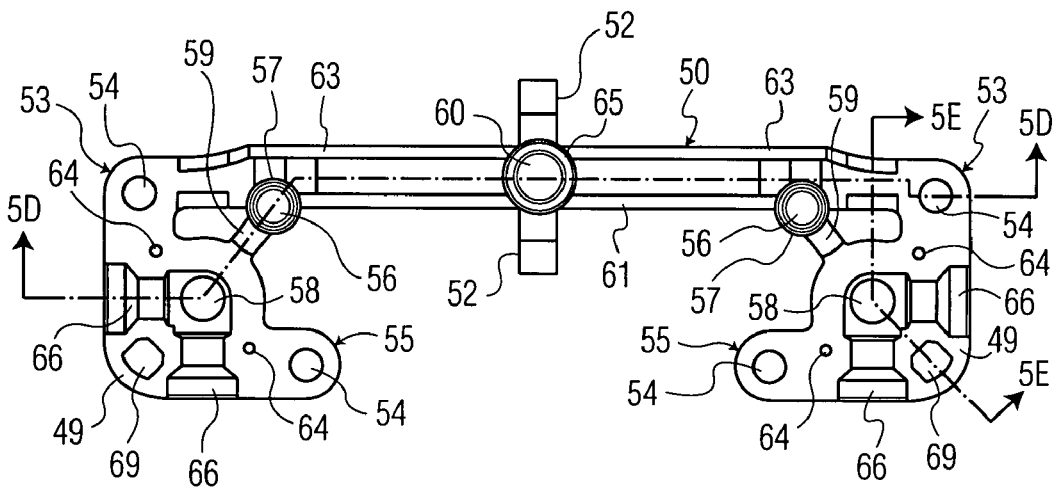
Figure 5D:
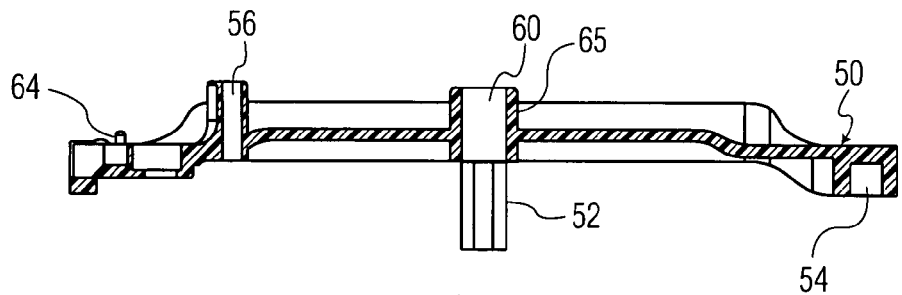
Figure 5E:
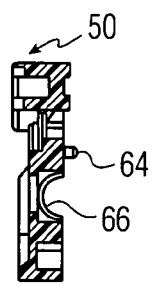
Figure 5F:
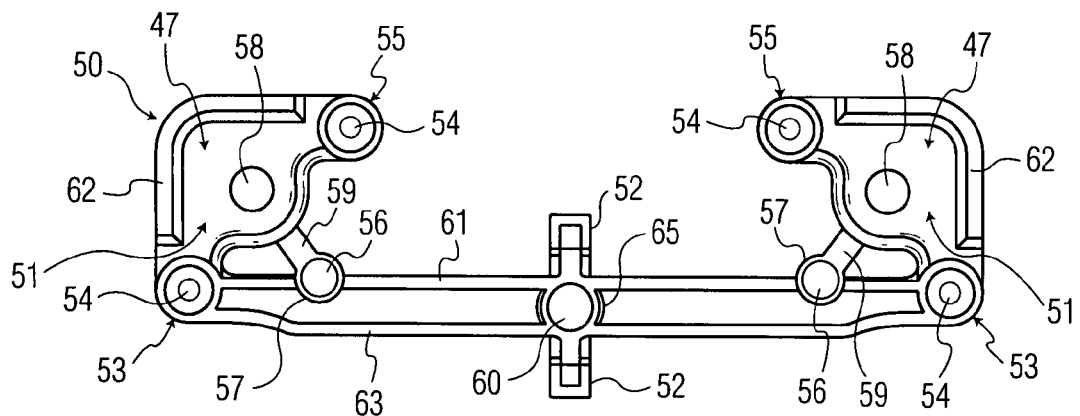

The design or configuration for a cross member 50 for a shorting bypass bar assembly of the present invention is shown in FIGS. 5A through 5E. As shown, the cross member 50 includes a centrally located bridge member 52. Each end of the cross member 50 is terminated to a mounting flange 53. A following portion mounting member 51 is interposed between the mounting flange 53 and another mounting flange 55 offset 90° therefrom, as shown. Each of the mounting flanges 53 and 55 include a centrally located screw hole 54. A guide pin hole 56 is located proximate each of the two mounting flanges 53. The guide pin holes 56 are each centrally located within a guide pin post 57. A strengthening rib 59 is connected between each of the guide pin posts 57 and the bottom portion of mounting member 51, as shown. A throughhole 58 is located in a portion of each one of the bottom portions of mounting members 51, as shown. The bridge member 52 is centrally located between two opposing side rail members 61 and 63, respectively, as shown. The bridge member 52 includes a centrally located post 65 having a plunger shaft throughhole 60, as shown. Note that the guide pin posts 57 are located in portions of the side rails 61. A top portion 49 of the mounting member 51 includes two locating studs 64, as shown in FIGS. 5B, C, D, and E. The locating studs 64 are configured for fitting into holes 30 of top cover 24 (see FIGS. 3A and 3B). Each of the opposing top portions 49 of the mounting member 51 also each include pin receptacle holder semicircular mounting recesses 66, each receiving a half portion of a right angle pin receptacle holder 36 (see FIG. 4), for permitting the holder 36 to be oriented for either pedestal or aerial cabling connections within associated aerial or pedestal ports of an associated housing, as described below. An index stud 69 is located in and protrudes from the top portions 49 of each one of the mounting members 51, as shown, with each of the index studs 69 being configured for fitting into the locating holes 34 of the top cover 24 (see FIGS. 3A and 3B).

Figure 6A:
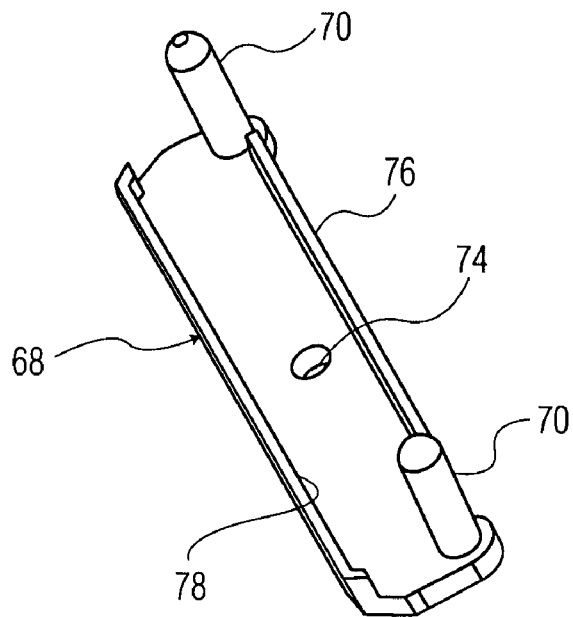
FIGS. 6A through 6E show a top pictorial view, a bottom pictorial view, a top plan view, a longitudinal cross sectional view taken along 6D-6D of 6C, and a bottom plan view, respectively, of a shorting bypass bar holder for one embodiment of the invention.
Figure 6B:
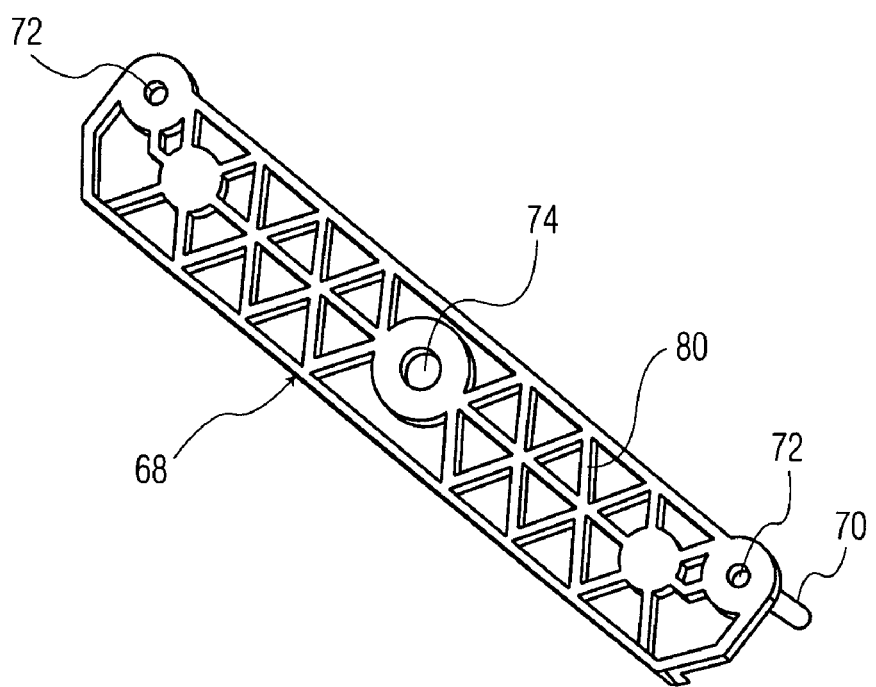
Figure 6C:
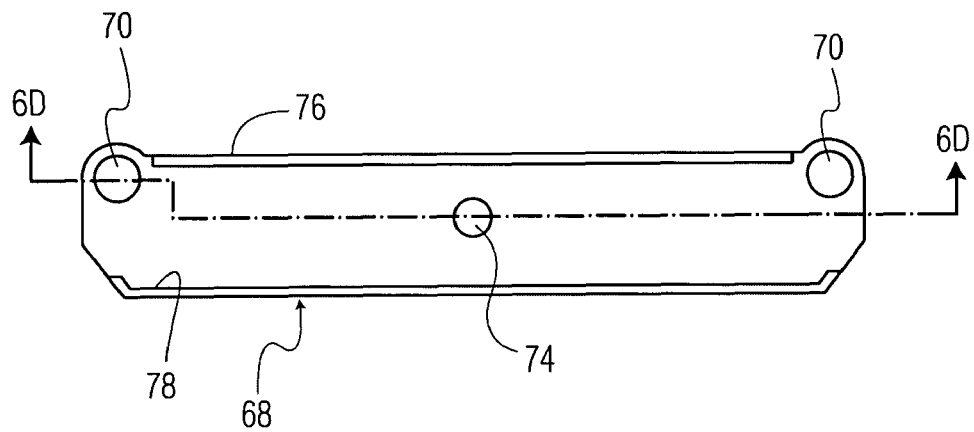
Figure 6D:
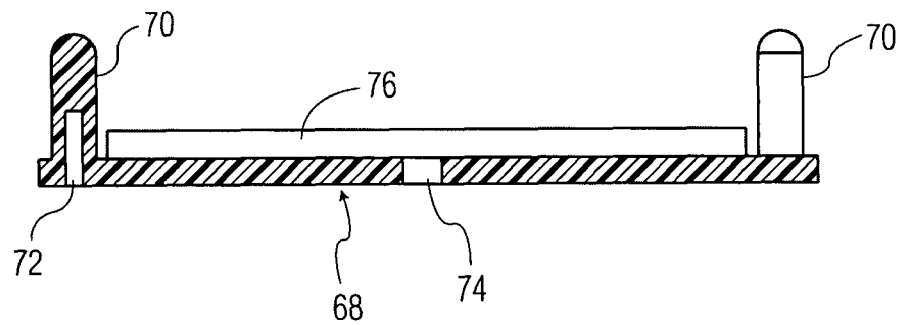
Figure 6E:
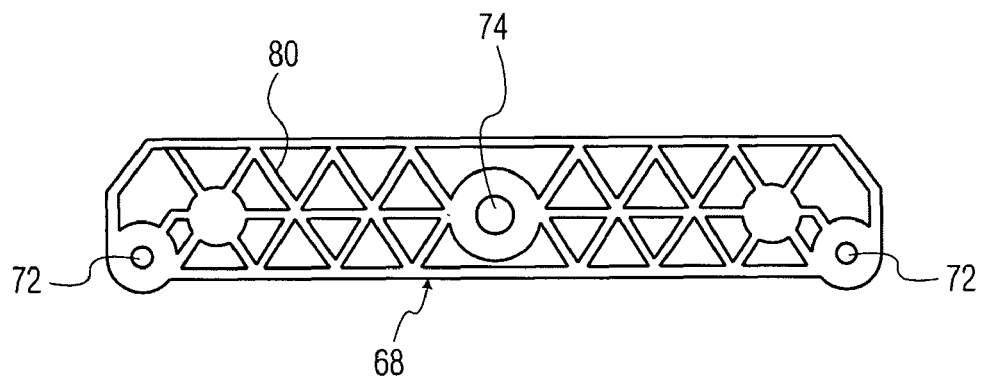
Figure 7A:
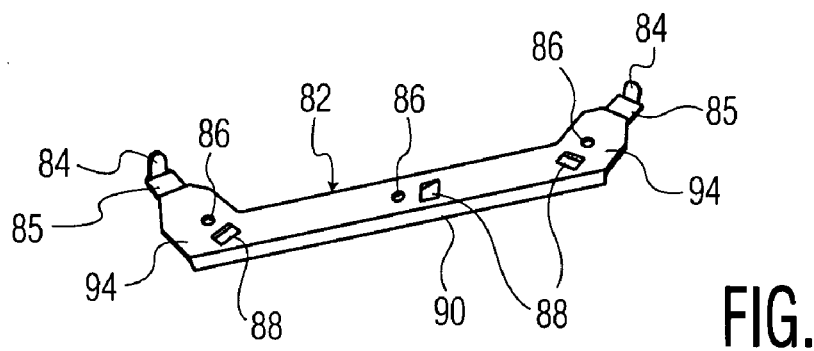
FIGS. 7A through 7E show a top pictorial view, bottom pictorial view, bottom plan view, cross sectional view taken along 7D-7D of FIG. 7C, and a front pictorial view relative to FIG. 7C, respectively, of a metal shorting bypass bar for an embodiment of the invention.
Figure 7B:
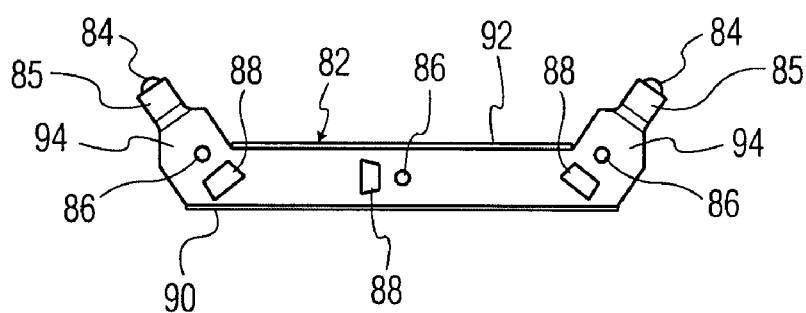
Figure 7C:
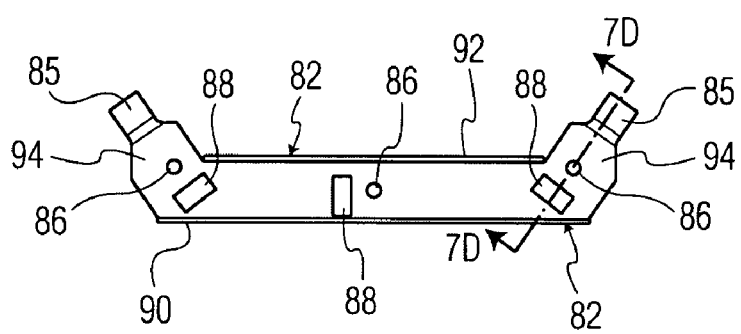
Figure 7D:
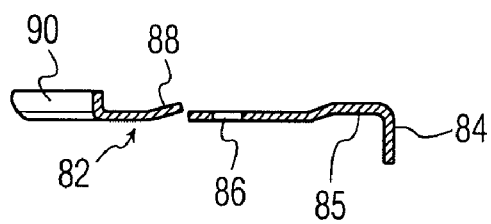
Figure 7E:
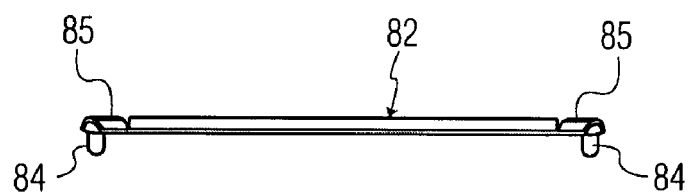
Figure 8A:
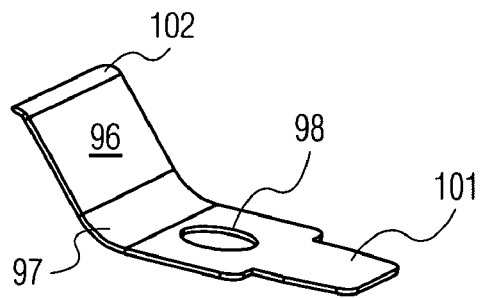
FIGS. 8A through 8E show a top pictorial view, a top plan view, a left-side view with the right-side view being a mirror image thereof, a bottom pictorial view, and a front elevational view, respectively, of a metal grounding finger for the shorting bypass bar for one embodiment of the invention.
Figure 8B:
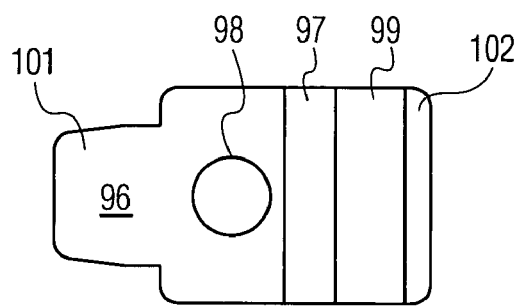
Figure 8C:
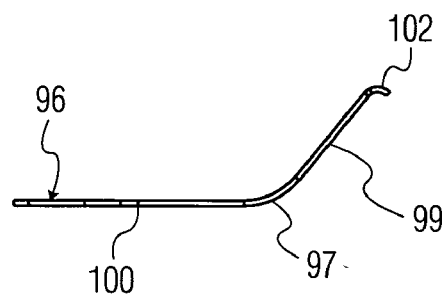
Figure 8D:
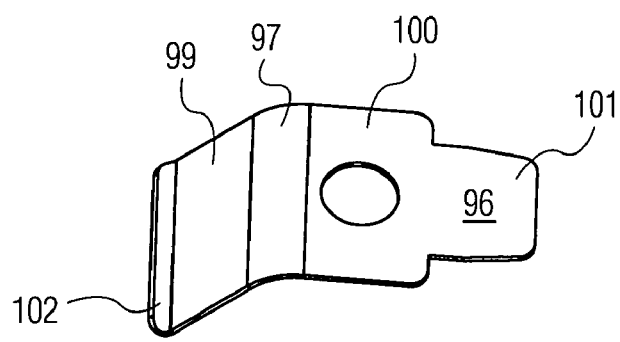
Figure 8E:
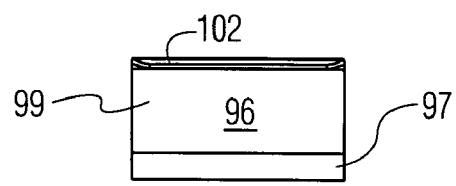

The design for a shorting bypass bar holder 68 embodiment of the invention is shown in FIGS. 6A through 6E. The holder 68 includes a pair of guide pins 70 opposing one another from extreme corner ends. In the opposite side from the guide pins 70 of holder 68, screw holes 72 are provided which are partly countersunk into the guide pins 70. A screw through hole 74 is included in a central portion of the holder 68, as shown. A straight raised ledge 76 is provided between the guide pins 70. On the opposite edge from the raised ledge 76 is a contoured raised ledge 78. A waffled bottom 80 is provided as shown in FIG. 6B.

In FIGS. 7A through 7E, an electrically conductive metal shorting bypass bar 82 is shown. Shorting bypass bar 82 includes an extended right angle oriented connector finger 84 at each end of the bar 82, as shown. Three through holes 86 are provided as shown for receiving screws. Three locating tabs 88 for orienting grounding fingers 96, as will be described below, are provided as shown. A raised bottom ledge 90 is provided along one edge portion of bar 82, and an opposing raised bottom ledge 92 is provided along the opposite edge of shorting bypass bar 82. Two opposing skewed end portions 94 are provided. Note that the contours provided interior of each of the connector fingers 84 are configured to minimize electrical contact with an associated right-angle pin receptacle holder 36, as described above, to minimize electrical capacitive coupling therebetween when the two components are spaced apart.

The design configuration for an electrically conductive metal grounding finger 96 is shown in FIGS. 8A through 8E, and consists of a single piece of suitable electrically conductive metal material, in this example. The bottom portion 100 of the grounding finger 96 is flat, and includes a screw mounting hole 98. An end mounting tab 101 is provided on the bottom portion 100 for sliding under an associated locating tab 88 of shorting bypass bar 82. A portion 99 is upwardly projecting from a curved section 97, as shown. The upward portion 99 is straight, and its free end or edge portion 102 is curved downward.

Figure 9A:
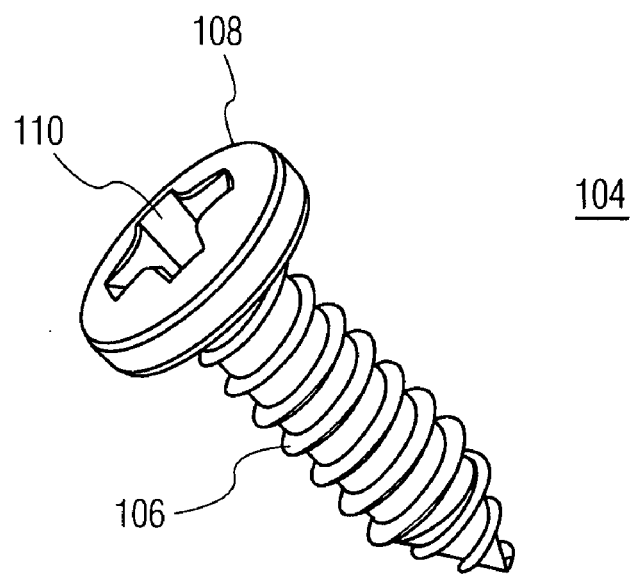
FIGS. 9A and 9B show a side pictorial view looking toward the top portion, and a front elevational view, respectively, of a bottom screw for an embodiment of the invention.
Figure 9B:
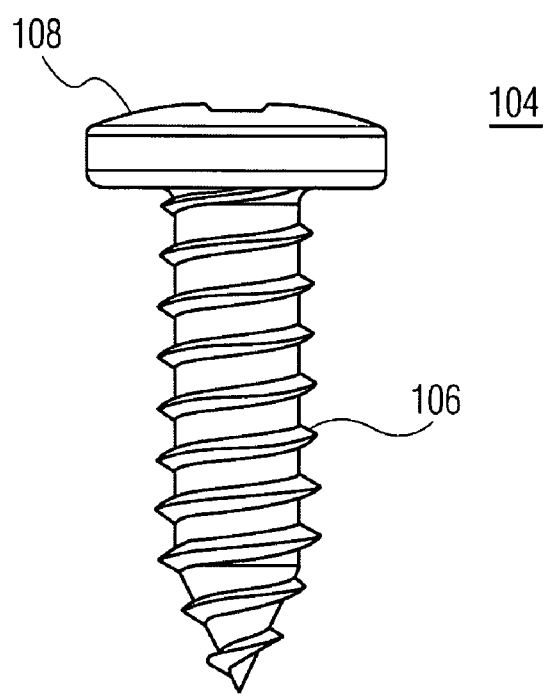
Figure 10A:
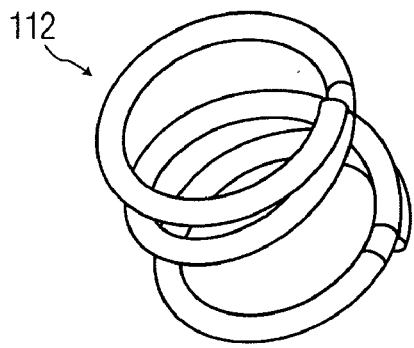
FIGS. 10A through 10D show a pictorial view, a front elevational view, a cross sectional view taken along 10C-10C of FIG. 10B, and a top plan view, respectively, of a metal spring or springs for use with an actuator plug plunger for an embodiment of the invention.
Figure 10B:
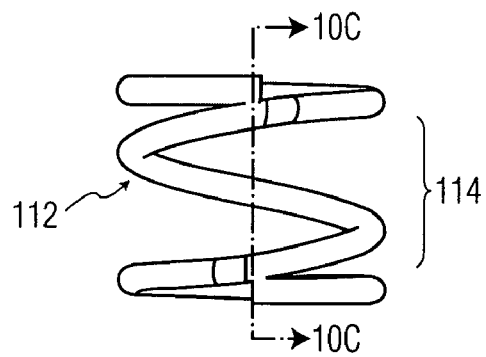
Figure 10C:
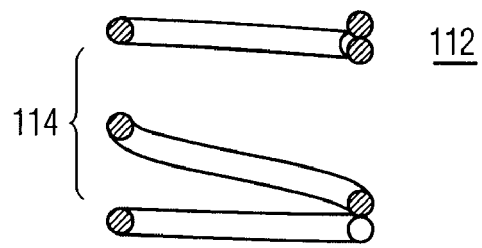
Figure 10D:
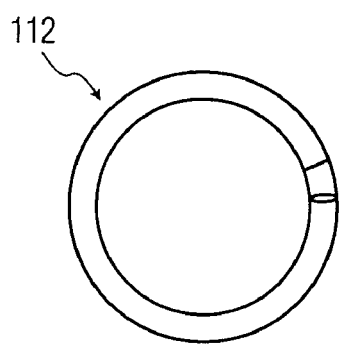

The configuration for a self-tapping bottom screw 104 is shown in FIGS. 9A and 9B. The screw 104 includes threads 106, and a screw head 108 having a centrally located Philips slotway 110, as shown.

The design for a spring 112, two of which are mounted on the actuator plunger 2 (see FIG. 14), is shown in FIGS. 10A through 10D. The spring 112 is designed for minimizing electrical capacitance and inductance, whereby after the top and bottommost turns, the spring immediately goes into a helix configuration 114. In the preferred embodiment, the spring consists of a suitable metallic material. However, the spring is not meant to be so limited, and in certain applications can be provided by any suitable plastic electrically non-conductive material.

Figure 11A:
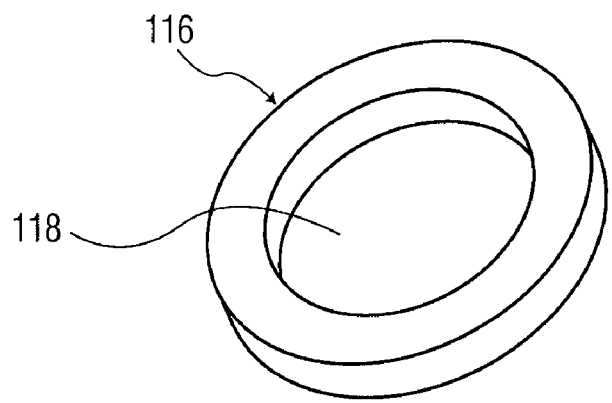
FIGS. 11A through 11C show pictorial, side elevational, and top plan views of a spring separator for an embodiment of the invention.
Figure 11B:
Figure 11C:
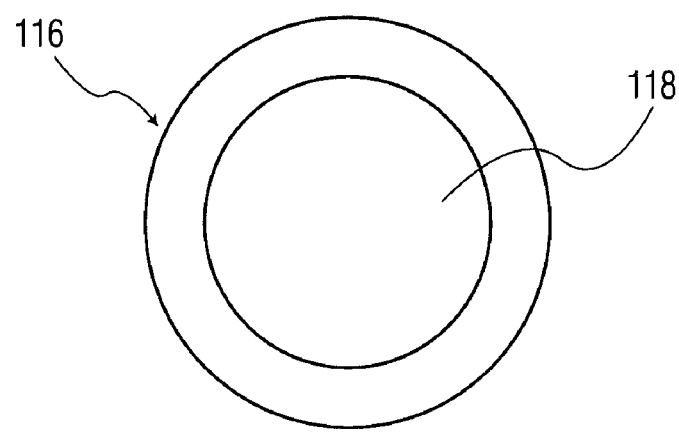

As will be described in greater detail below, two of the springs 112 are mounted on the actuator plunger 2 with a spring separator 116 located between the springs 112. The design for the spring separator 116 is shown in FIGS. 11A through 11C, and appears as a washer having a centrally located relatively large through hole 118, relative to the overall diameter of the spring separator 116. The spring separator 116 consists of an electrical non-conductive material such as a suitable plastic material. Note that the purpose of using two metallic springs 112, in this example, separated by separator 116 is to minimize electrical capacitance and inductance, by avoiding use of a single longer spring of similar spring force to the combination of springs 112. The insulating washer or spring separator 116 is installed between the two springs 112 to insure each springs' 112 self-resonant frequency is higher than 3 GHz, to prevent them from forming a series circuit with one another that increases their inductance, causing their self-resonant frequency to be lowered. The springs 112 are compression springs, in this example. Note that the use of two springs 112 is not meant to be limiting. A single spring can be used if its self-resonant frequency is higher than the operating maximum frequency, 3 GHz in this example, or more than two springs separated by insulating washers can be used provided each has a sufficiently high self-resonant frequency.

Figure 12A:
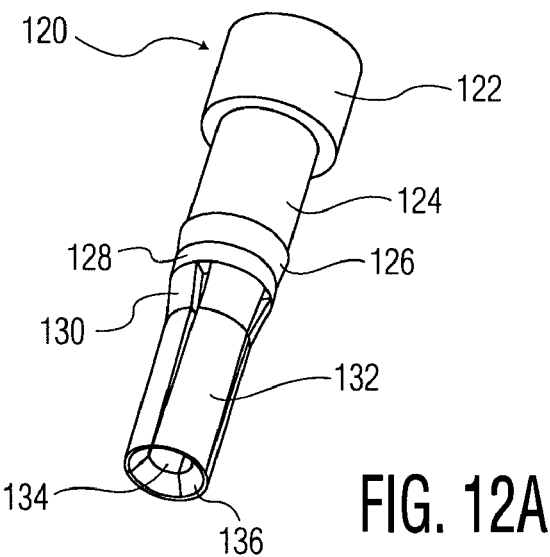
FIGS. 12A through 12C show a pictorial view, a top plan view, and a longitudinal cross sectional view taken along 12C-12C of FIG. 12B, respectively, of a female pin receptacle for snapping into a right-angle pin receptacle holder for an embodiment of the invention.
Figure 12B:
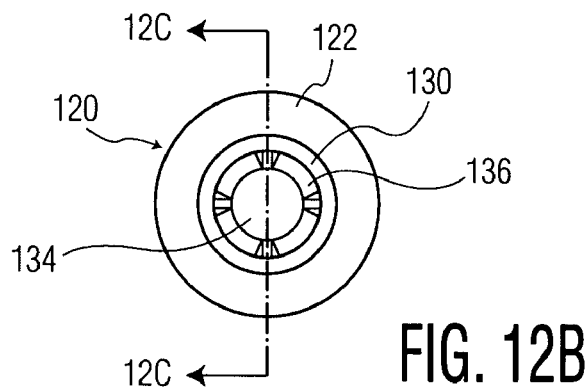
Figure 12C:
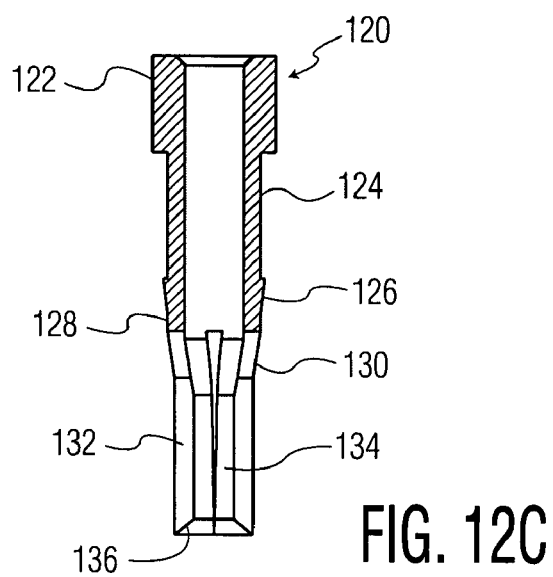

In FIGS. 12A through 12C, a female pin receptacle 120 is shown, which consists of any suitable electrically conductive metallic material. The receptacle 120 includes a circular rear portion 122, followed by a reduced diameter portion 124, followed by a narrow circular converging portion 126, followed by a narrow band-like portion 128, followed by a striated downward converging portion 130, finally followed by a striated circular front portion 132. An entry hole 134 is provided in the end of the circular portion 132 for receiving a male pin. The entry hole 136 includes a beveled portion 136, as shown.

Figure 13A:
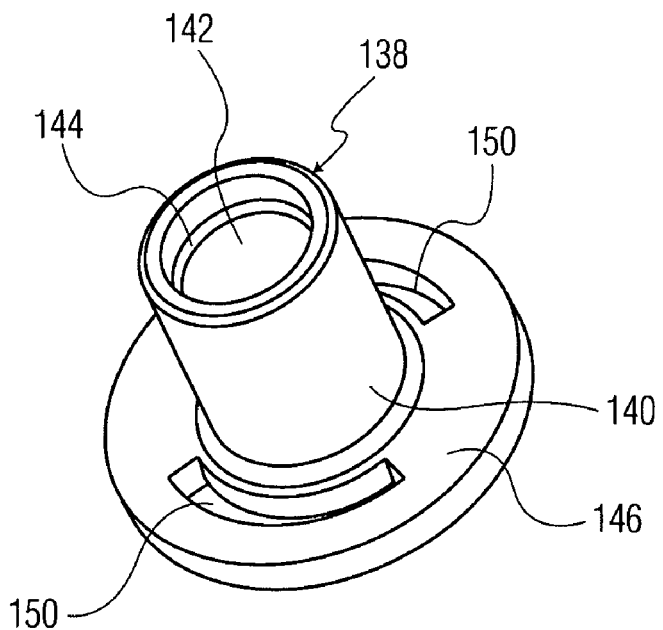
FIGS. 13A through 13D show a pictorial view, a top plan view, a cross sectional view taken along 13C-13C of FIG. 13B, and a cross sectional view taken along 13D-13D of FIG. 13B, respectively, of a plastic KS stinger pin guide for an embodiment of the invention.
Figure 13B:
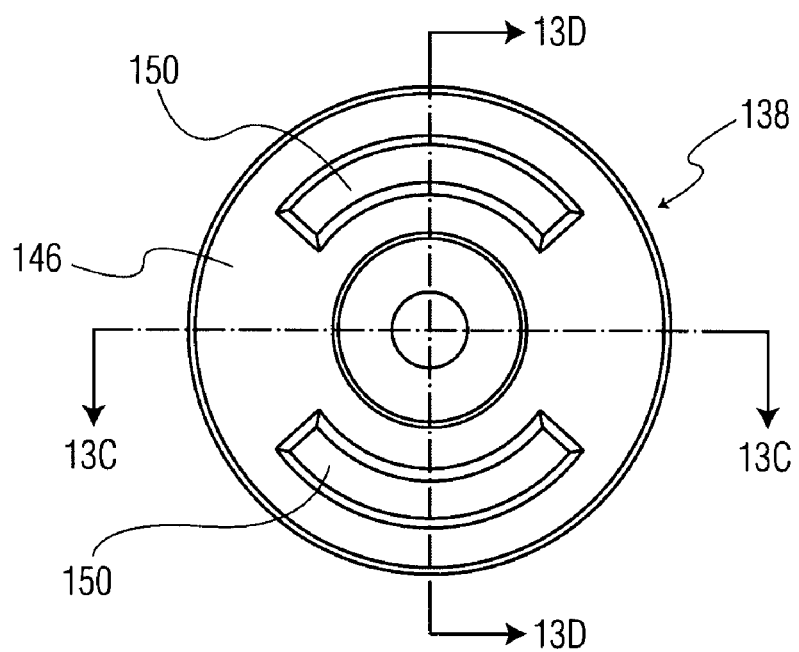
Figure 13C:
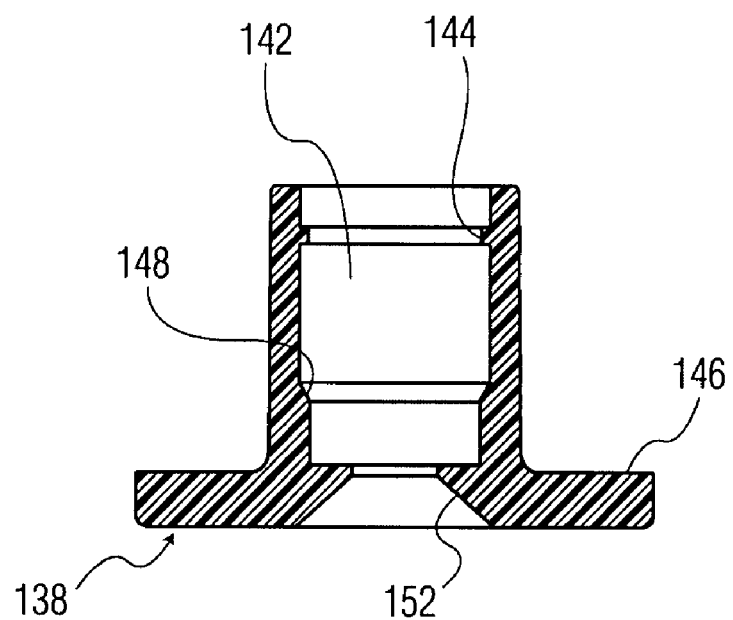
Figure 13D:
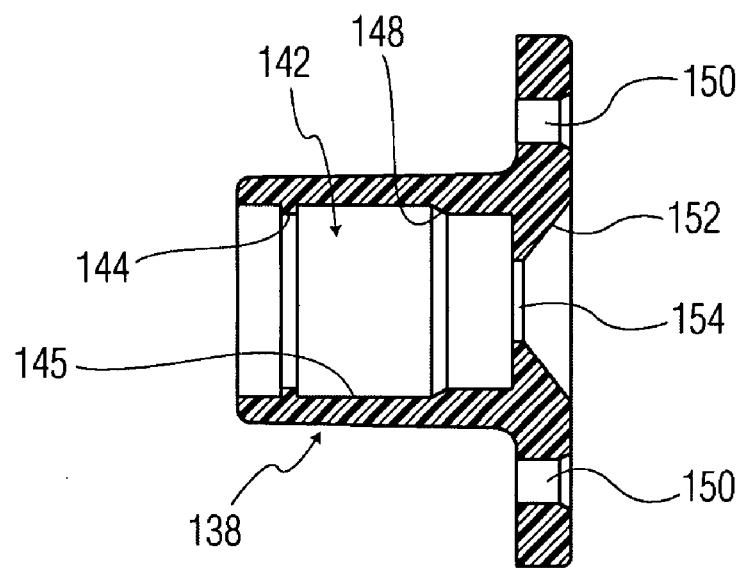
Figure 14:
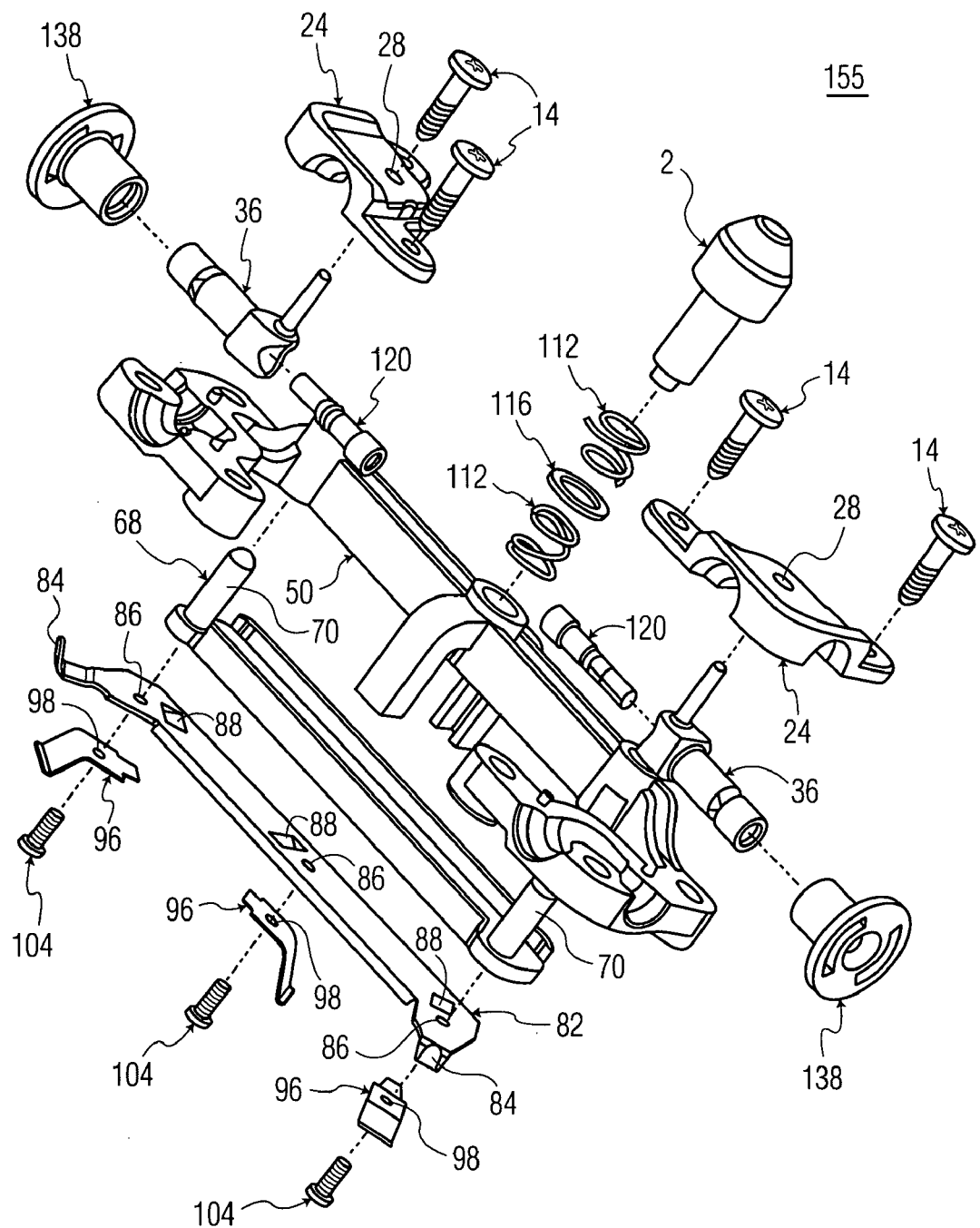
FIG. 14 shows an exploded assembly view of a bypass switch or shorting bypass bar assembly for an embodiment of the invention which incorporates the individual components of FIGS. 1 through 13D, as shown.
Figure 15A:
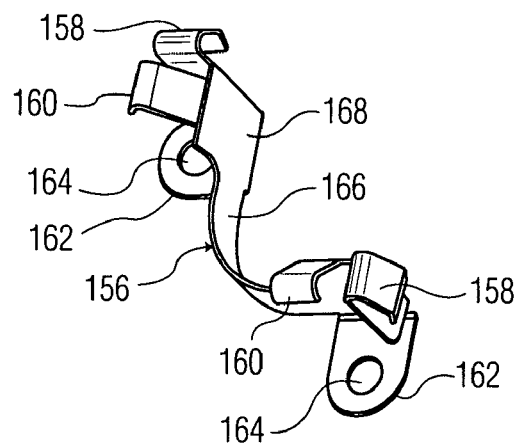
FIGS. 15A through 15D show a pictorial view looking toward the top, a top plan view, a bottom plan view, and a front elevational view, respectively, of an isolating ground shield for an embodiment of the invention.
Figure 15B:
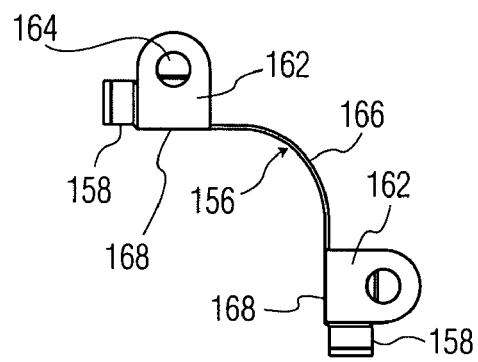
Figure 15C:
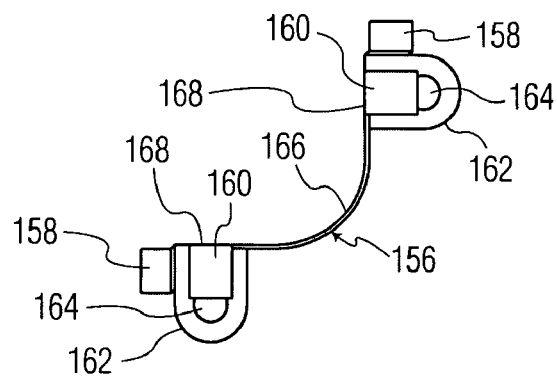
Figure 15D:
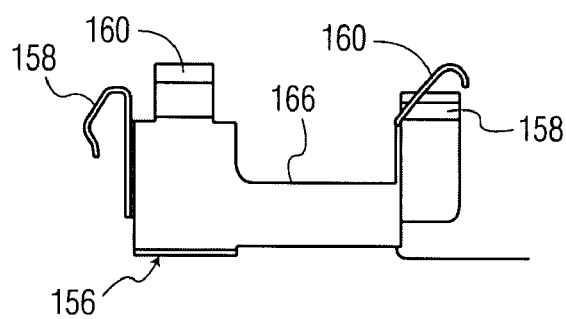
Figure 16A:
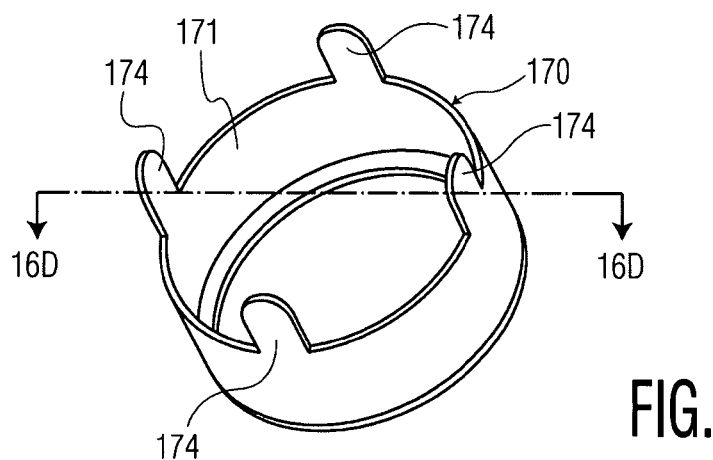
FIGS. 16A through 16D show a pictorial view looking toward the bottom, a pictorial view looking toward the top, a top plan, and a cross sectional view taken along 16D-16D of FIG. 16A, respectively, of a unitary circular ground shield for use on a 75 ohm female connector assembly mounted on a printed circuit board for an embodiment of the invention.
Figure 16B:
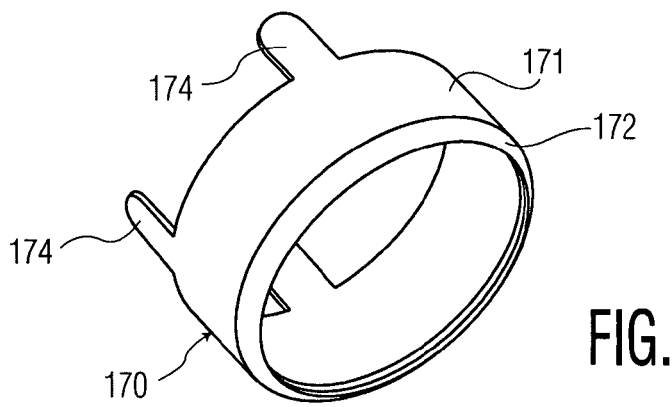
Figure 16C:
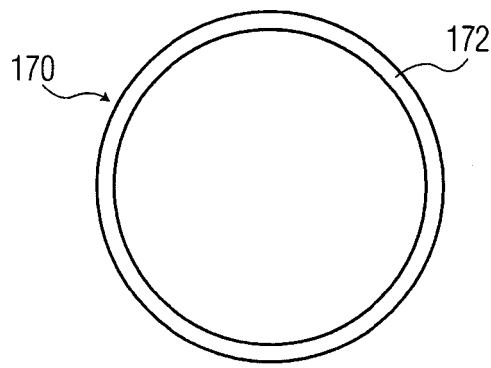
Figure 16D:
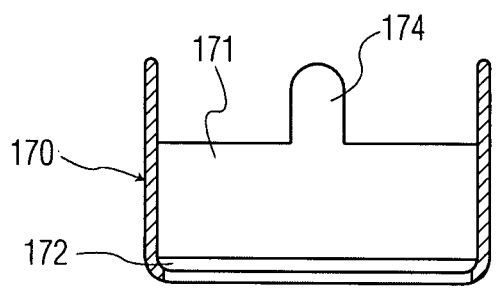

A KS stinger pin guide 138 is shown in FIGS. 13A through 13D. The pin guide 138 preferably consists of a suitable electrically non-conductive plastic material. The design thereof includes a cylindrical portion 140 that includes a centrally located hole 142 configured for receiving female connector 40 of right-angle pin receptacle holder 36 (see FIGS. 4A-4E). The pin guide 138 further includes an interior circular rib 144 about an interior wall portion of hole 142, as shown, for snapping over a ferrule 42 of the pin receptacle holder 36, as previously described. Note in FIG. 13D that a relatively wide circular portion or cavity 145 is provided between the circular rib 144 and a converging portion 148 within the walls of the hole 142, as shown. A round flange 146 is provided at the lower end of the cylindrical portion 140. Arc shaped receptive slots 150 are provided in the flange 146, as shown, for receiving a tool (not shown) to permit the removable of installation of the pin guide to accommodate either aerial or pedestal cable connections for the associated device, as will be described in greater detail below. With reference to FIGS. 13C and 13D, also provided is a converging front portion 152 about the entry into hole 142, followed by a relatively narrow circular portion 154, as shown.

Figure 20:
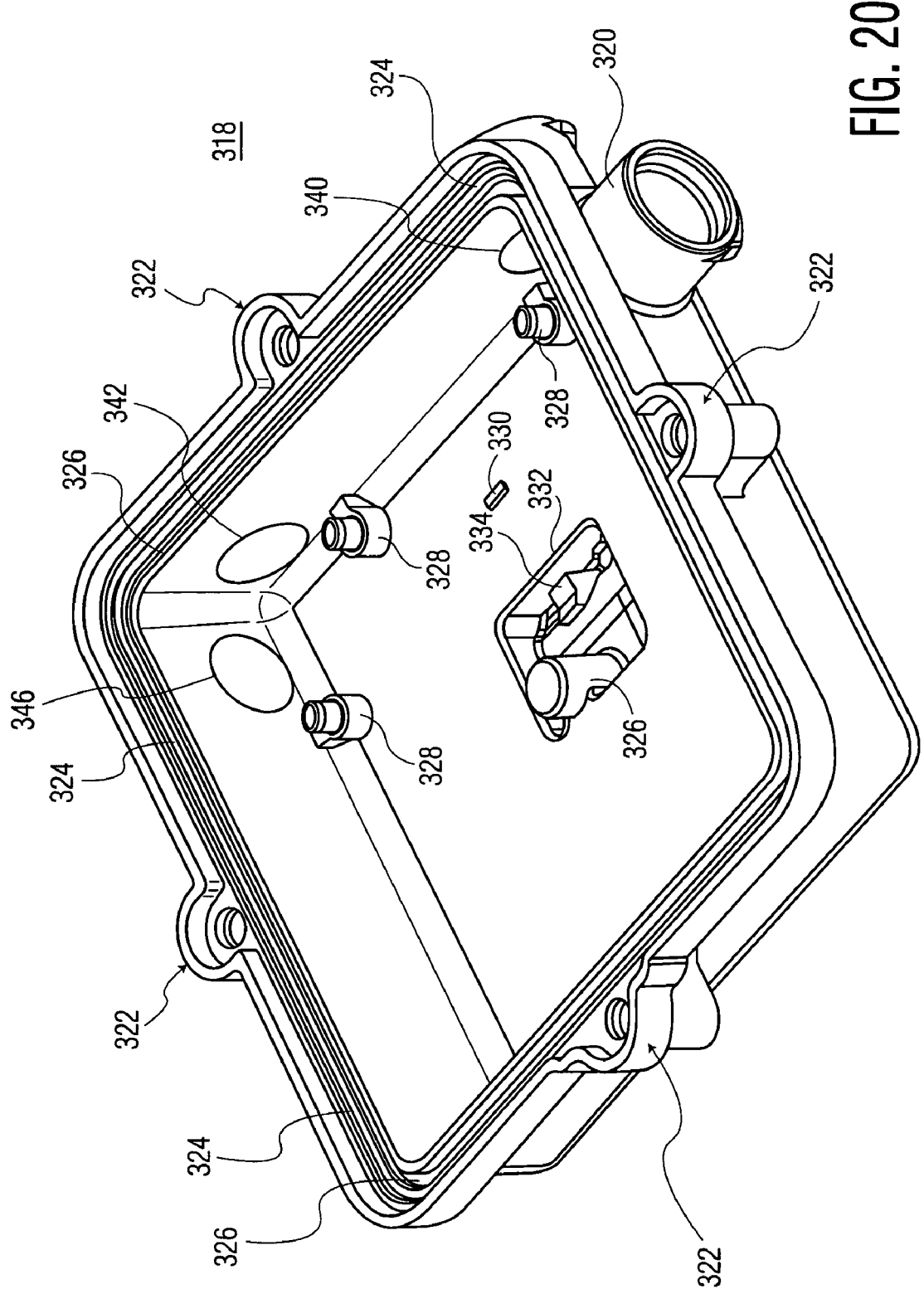
FIG. 20 shows a pictorial view of a bottom housing for an embodiment of the invention.

The various components of multiple embodiments of the invention are assembled as shown in the exploded assembly of FIG. 14 to provide a bypass switch or shorting bypass bar assembly 155. Note that the screws 14 secure bypass switch assembly 152 to standoffs 328 of a multi-tap housing, in this example, as shown in FIG. 20. A centrally located bottom screw 104 has its threaded portion pushed through screw mounting hole 98 of the centrally located grounding finger 96, through the center screw hole 86 of shorting bypass bar 82, for the retention and securement into the screw hole 13 located at the bottom of the spring mount shaft 9 of the plunger 2 (see FIG. 1A). The mounting screws 104 located on either side of the centrally located mounting screw 104, have their threaded portions pass through the mounting holes 98 of their associated grounding fingers 96, through associated screw holes 86 at each end of the shorting bypass bar 82, for retention and securement into the associate screw holes 72 located in the bottom portion of the guide pins 70 of shorting bypass bar holder 68 (see FIGS. 6D and 6E). An example of the use and mounting of the bypass switch assembly 155 is described in greater detail below. The female pin receptacles 120 are configured to securely have a portion fit into and be retained by an associated pin receptacle holder 36. Note that the mounting tabs 101 of grounding fingers 96 are partially inserted under associated locating tabs 88 on the shorting bypass bar 82 to properly orient the grounding fingers 96, before installing the associated screws 104.

The present invention is described in association with its use in a multi-tap device, but such use is not meant to be so limiting. However, for the example given herein, in order to insure a 75 ohm impedance for various of the electrical connectors of the associated multi-tap, it is necessary to use uniquely designed shielding in order to isolate electrical circuitry on a printed circuit board (PCB) 292 secured to the interior bottom face of a multi-tap cover plate 300 (see FIG. 19), in this example. The ground shields utilized, and other components utilized for providing the necessary 75 ohm impedance, and operation of the associated multi-tap device, along with other necessary unique components are described immediately below.

In FIG. 15 an isolating ground shield 156, consisting of a suitable Mu-metal material is shown in FIG. 15A through 15D. As shown, the ground shield 156 is preferably configured from a single piece of shielding material such as Mu-metal, or other suitable shielding material. More specifically, the ground shield 156 is configured to include a housing grounding finger or tab 158, a second grounding tab 160 adjacent a grounding finger 158 at each end of the shield 156, and a mounting tab 162 located at each end of the shield 156, with each mounting tab including a screw hole 164, as shown. The central portion of the ground shield 156 consists of a curved portion 166. The curved portion 166 terminates at each end to end portions 168, whereby the end portions 168 each include grounding finger 158 and grounding tab 160 as previously described, along with a mounting tab 162.

As shown in FIGS. 16A through 16D, another metal ground shield 170 for use in combination with immediately previously described isolating ground shield 156, as will be described in detail below, also consists of a single piece of electromagnetic ground shield material such as Mu-metal, for example. As shown, the ground shield 170 includes a circular band main portion 171 that has a beveled top portion 172, and extending from a bottom edge portion four equally spaced apart printed circuit board mounting tabs 174.

Figure 17A:
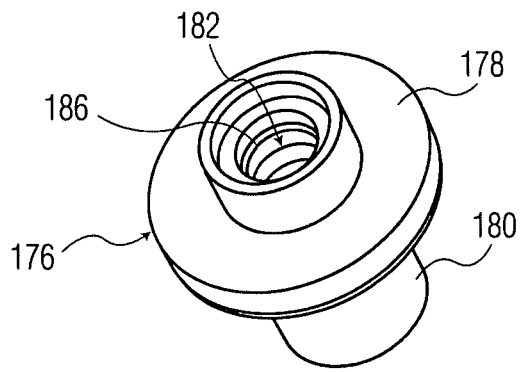
FIGS. 17A through 17D show a pictorial view looking toward the top, a side elevational view, a top plan view, and a longitudinal cross sectional view taken along 17D-17D of FIG. 17C, respectively, of a holder for a female pin receptacle for an embodiment of the invention.
Figure 17B:
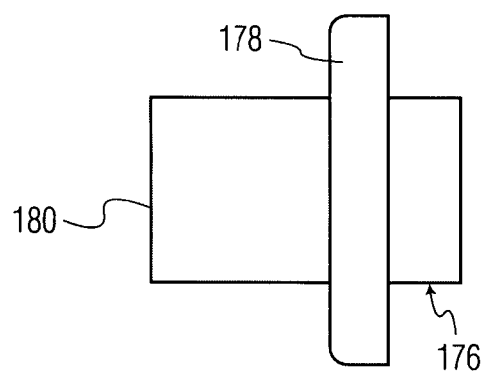
Figure 17C:
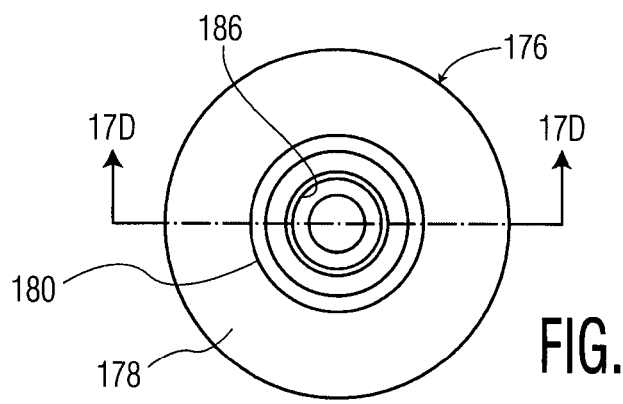
Figure 17D:
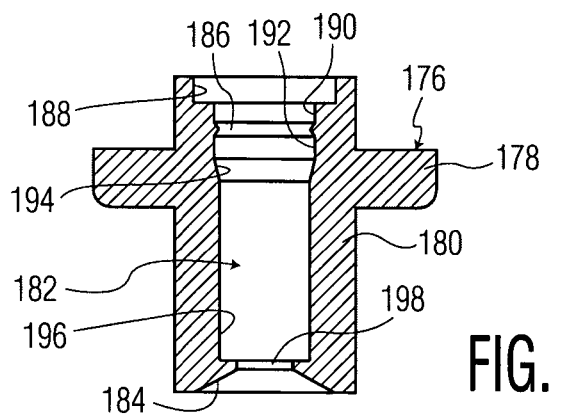
Figure 18A:
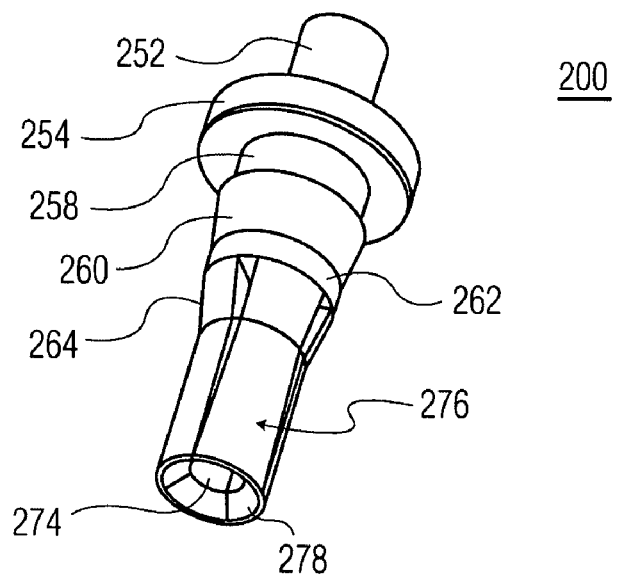
FIGS. 18A through 18D show a pictorial view, a front elevational view, a top plan view, and a longitudinal cross sectional view taken along 18D-18D of FIG. 18C, respectively, of a center female pin receptacle that installs into the holder of FIG. 17 for a female connector assembly mounted on a printed circuit board for an embodiment of the invention.
Figure 18B:
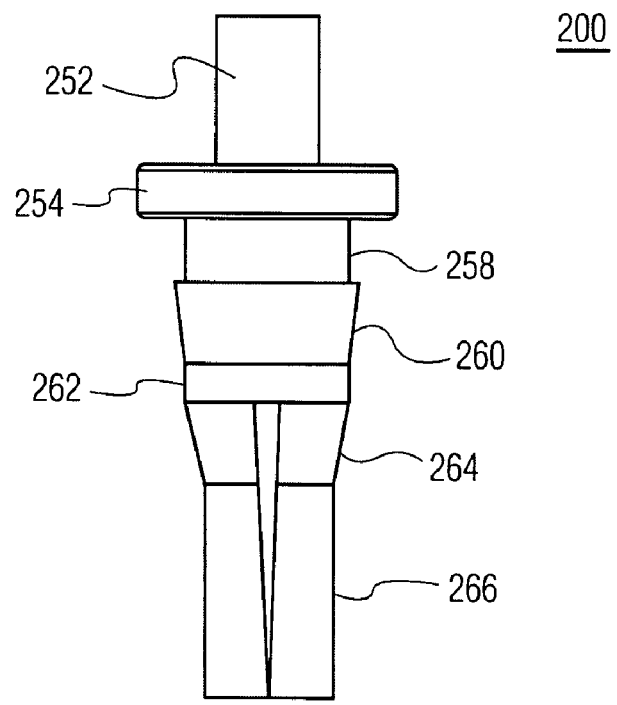
Figure 18C:
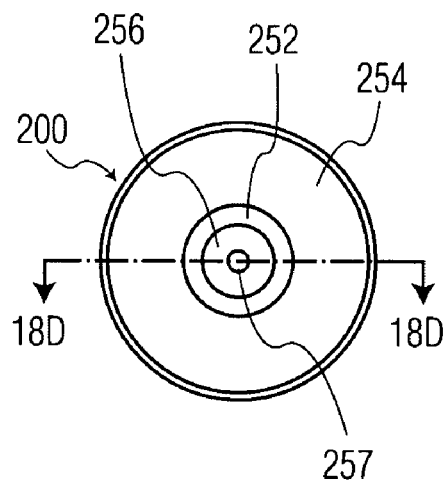
Figure 18D:
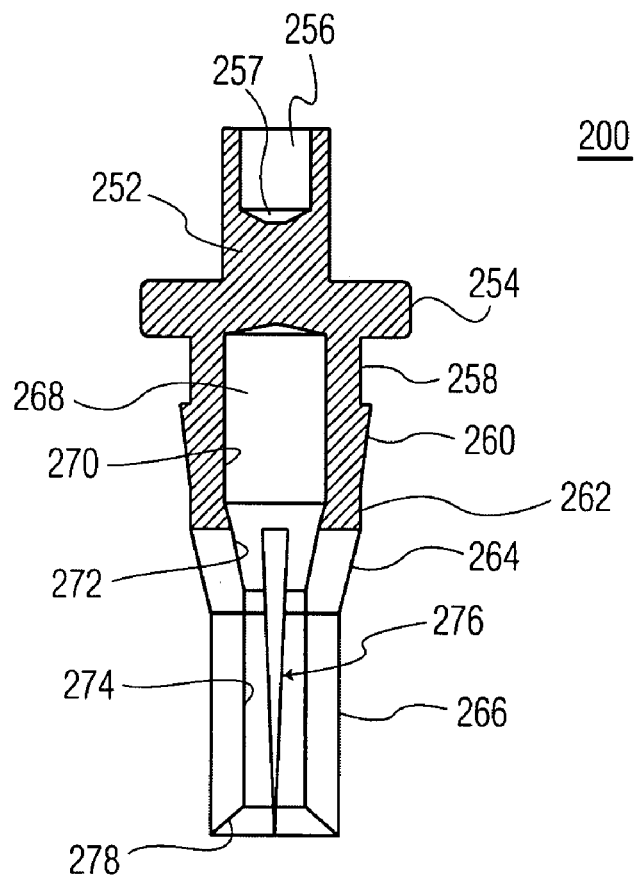

FIGS. 17A through 17B show the design configuration for a holder for a female pin receptacle holder 176, that consists of a single piece of electrically insulative or non-conductive material, such as suitable plastic material. The pin receptacle holder 176, as shown, includes a circular flange 178, a cylindrical central portion 180 extending from the bottom portion of the flange 178, a through hole 182 to receive a female pin receptacle 200 (see FIG. 18), a beveled countersunk flat opening 184 for receiving a male pin, and a circular rib 186 for snapping in a portion of the female pin receptacle 200. Further included at the bottom of the pin receptacle 176 a relatively large diameter countersunk hole 188, inwardly followed by the second countersunk hole of relatively reduced inside diameter, followed by the previously described circular rib 186, followed by a third hole portion 192 having the same diameter as the hole 190, followed by an inwardly diverging hole portion 194, immediately followed by a main hole portion 196, immediately followed by the relatively narrow reduced diameter portion 198, followed by the previously mentioned beveled countersunk front portion 184, whereby all of the successive hole portions together form the through hole 182.

A female pin receptacle 200 is shown in FIGS. 18A through 18D, and preferably consists of a single piece of suitable electrically conductive metal material, such as brass, for example. The female pin receptacle 200, as shown, is configured to include a circular portion 252, a circular flange 254, a countersunk hole 256 having a bottom portion 257, a rectangular circular groove 258 extending from a frontward portion of the circular flange 254, followed by a circular converging portion 260, followed by a narrow circular band portion 262, followed by a converging portion 264, followed by a front circular cylindrical-like portion 266. Proceeding frontward from the circular rectangular groove 258 through the previously described portion terminating with the front circular portion 266, centrally located therein is a truncated hole 268 that has an innermost circular hole portion 270, leading frontward followed by a converging hole portion 272, followed by a frontmost hole 274, the front portion of the latter having a beveled hole opening 278. Also, the front portion of the female pin receptacle 200 is provided with a striated front portion 276, as shown.

In FIG. 19, an exploded assembly diagram is shown for various of the aforesaid components, and additional components relative to a multi-tap cover plate 300. As shown, the assembly includes the previously mentioned isolating ground shield 156, connector ground shield 170, female pin receptacle holder 176, and a female pin receptacle 200. Also, the previously described the self tapping bottom screws 104 are shown. Further shown is ground shield plate 280 having multiple mounting taps 282, each with screw holes 284, and a plurality of grounding fingers 286 arranged in a comb-like configuration. Also, each end of the ground shield plate 280 further includes a single grounding finger 287 proximate the comb-like grounding fingers 286, as shown. A mu-metal ground shield 288 is shown for shielding a plug-in filter (not shown). A protective plastic cover 290 is included for protecting components mounted on a printed circuit board (PCB) 292. Also, a pair of ground shield combs 294, configured as shown are provided for mounting on a top side of the PCB 292, the aforesaid other components being mounted to the bottom side of the PCB 292. A radio frequency (RF) shield gasket 296, consisting of a suitable RF shield gasket material, is positioned as shown adjacent to a moisture sealing gasket 298. Also included on the top portion of the multi-tap cover plate 300 are a plurality of plastic caps 302 for sealing off the openings of associated barrel housings 310, as shown. Each of the barrel housing 310 are included in a female connector assembly consisting of a lower pin holder 304, an electrical female pin 306, and an upper female pin holder 308, all mounted within the barrel housing 310, the latter being secured to the cover plate 300, as shown. A plurality of hex bolts 312 in association with washers 314 are used to secure bolt studs 316 of the cover plate 300 to the multi-tap housing 318 (see FIG. 20). In one embodiment of the invention, the multi-tap cover plate 300 is provided from a casting of aluminum diecast.

In FIG. 20, multi-tap housing 318 is shown, and consists of a single casting of aluminum diecast, in this example. As shown, multi-tap housing 318 includes a pair of aerial and pedestal input ports 320, 340, respectively, arranged at 90° to one another; a pair of aerial and pedestal output ports 346, 342, respectively, arranged at 90° to one another; a plurality of female threaded mounting studs 322; a recessed groove 324 for receiving the previously mentioned RF shield gasket 296; a recessed groove 326 for receiving the moisture sealing gasket 298; bypass switch mounting standoffs 328 for securing the bypass switch assembly 155 thereto; and locating stud 330 for locating the bridge 52 of the bypass switch assembly 155 in conjunction with the locating standoff 334, the standoff 334 being located within a recessed well 332, as shown. Also included in the recessed well 332 is a standoff 326, as shown.

Figure 21:
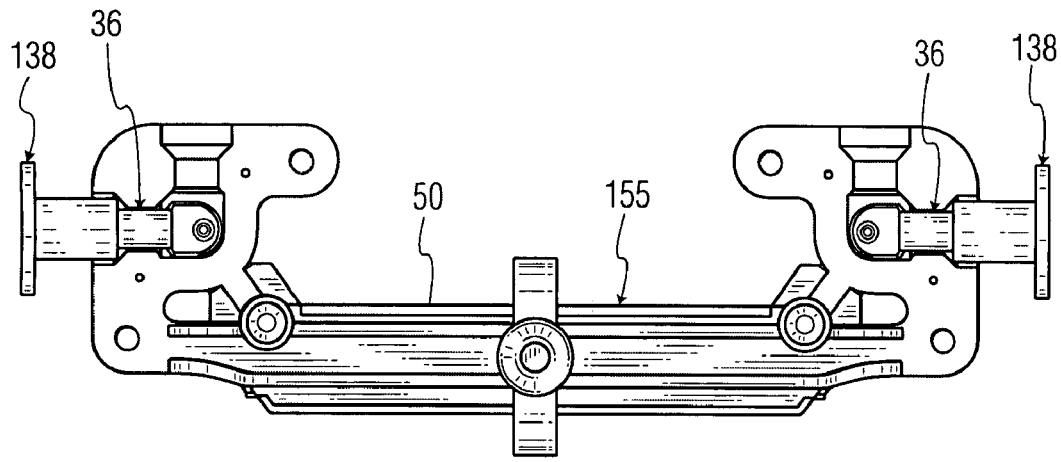
FIG. 21 shows the partial assembly of the subassembly of the right-angle pin receptacle holder of FIG. 4 and KS stinger pin guide of FIG. 13 onto an end portion of the cross member of FIG. 5.

In FIG. 21, the partial assembly of a pin receptacle holders 36, and associated KS stinger pin guides 138, respectively, are shown as mounted onto a shorting bypass bar assembly 155.

Figure 22:
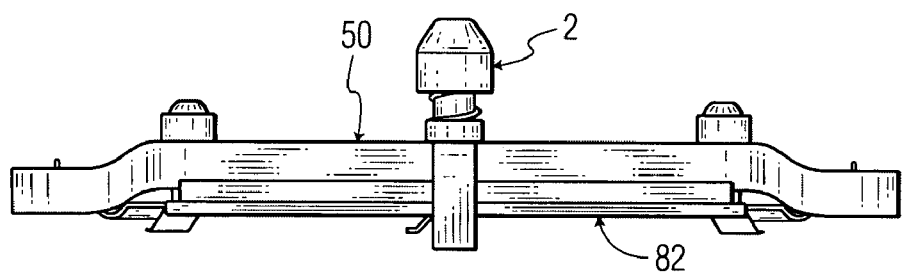
FIG. 22 shows a front elevational view of a partially assembled bypass switch.
Figure 23:
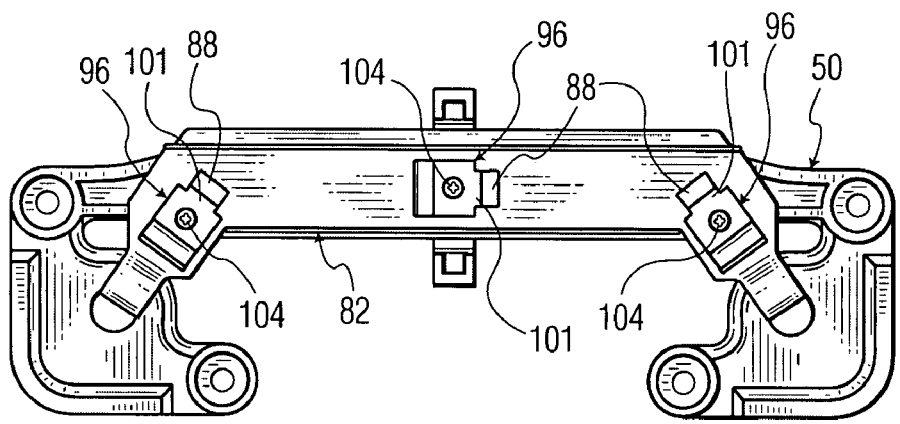
FIG. 23 shows a pictorial view of a partially assembled shorting bypass bar assembly.

FIGS. 22 and 23 each show pictorial views of a partially assembled bypass switch shorting bypass bar assembly 155. In FIG. 22, a front elevational view is shown of the partial assembly, whereas in FIG. 23, a pictorial view looking towards the bottom of the shorting bypass bar 82 and grounding fingers 96 are clearly shown.

FIG. 24 shows a top pictorial view of the bottom portion of a fully assembled top housing cover plate of multi-tap cover plate 300. The top of the PCB 292 is shown, along with the assembly of the isolating ground shield 156 of FIGS. 15A through 15B surrounding associated female pin receptacle holders 176 of FIGS. 17A through 17D, with the latter each being surrounded by the circular ground shields 170 of FIGS. 16A through 16D, as shown. In FIG. 25 an enlarged pictorial view is shown of the immediately previously described components relative to their mounting. Note the female pin receptacle 200 is installed within the female pin receptacle holder 176. In FIG. 24 the left-hand connector 176, 200 is for receiving input signals, and the right-hand connector 176, 200 is for providing output signals.

FIG. 26 shows a pictorial view looking into the interior portion of the lower section of the housing 318 with the bypass assembly 155 installed therein. The bypass switch assembly 155 is secured into the housing via the screws 14 of FIG. 2. FIG. 27 is a pictorial view looking into a main cable aerial input port 340 of housing 318. Note the positioning of the KS stinger pin guide 138 of FIGS. 13A through 13D.

FIG. 28 shows a partial cross section and a partial cutaway view of a fully assembled multi-tap, in this example, showing the bypass switch assembly 155, whereby the installed tap plate or top housing cover 300 forces and maintains the plunger 2 into its downwardmost position, compressing springs 112, whereby bent edges 102 of the grounding fingers 96 are forced into a mechanical and an electrical contact with the interior bottom portion 319 of the housing 318, thereby grounding the shorting bypass bar 82, to insure that the aforesaid components do not electrically interfere with the proper operation of the multi-tap. More specifically, the purpose of grounding the shorting bypass bar 82 is to prevent it from acting as a resonant element, causing frequency dip responses which will occur if the shorting bypass bar 82 is not grounded, thereby limiting the bandwidth or frequency response to well below 3 GHz. By grounding the shorting bypass bar 82, the frequency response can exceed 3 GHz.

It is important to note that the bypass switch assembly 155 uses one plastic actuator plunger 2 to move the shorting bypass bar assembly 155. The shorting bypass bar assembly 155 consistently moves parallel to the interior bottom 319 of the housing 318 by interaction between the two guide pin holes 56 of cross member 50, and the two guide pins 70 of shorting bypass bar holder 68, of FIGS. 5A-5F, and 6A-6E, respectively.

Figure 29:
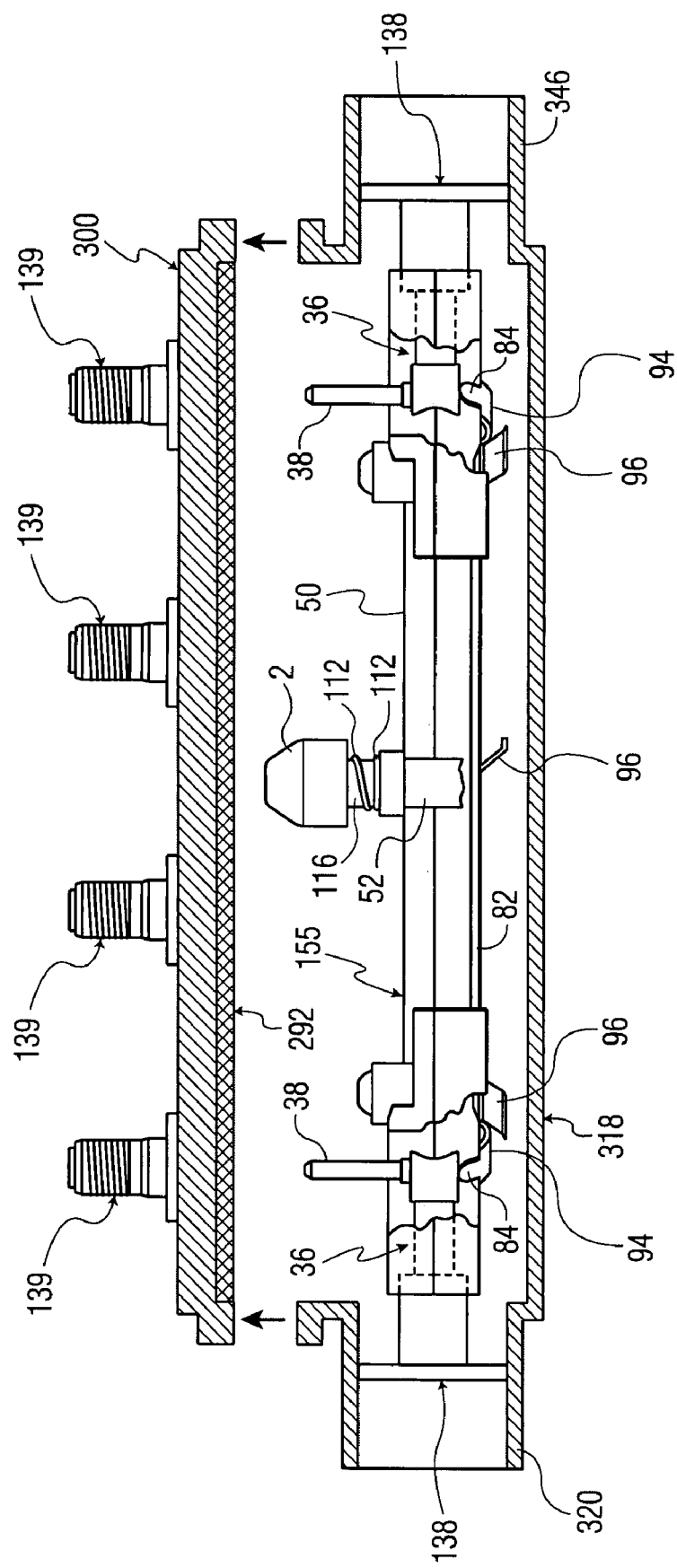
FIG. 29 shows a partial cross section and partial cutaway view of the removal of the top cover of the housing causing the actuator plunger to be moved upward by its associated spring, for in turn causing the grounding fingers at each end of the shorting bypass bar to electrically contact the electrically conductive right-angle pin receptacle holders at each end of the cross member of the shorting bypass bar assembly, for electrically connecting the input and output ports of the associated device together to insure continuity of the main cable connected therebetween.

FIG. 29 shows a partial cross section and partial cutaway view with the multi-tap cover plate 300 removed from the multi-tap housing 318, whereby the plunger 2 has been forced via the expansion of springs 112 to its upwardmost position, causing the grounding fingers 84 at each end of the shorting bypass bar 82 to electrically contact and be mechanically secured against their associated electrically conductive right angle pin receptacle holders 36 at each end of the cross member 50 of the bypass switch assembly 155, for electrically connecting the holder 36 at the aerial input port 320 to the holder 36 at the aerial output port 346 of the multi-tap device of this example. Note that if KS stingers 138 are alternatively positioned with their associated components in pedestal input and output ports 340, 342, respectively, these ports and their associated pin receptacle holders 36 will be electrically connected or shorted together in the identical manner. As previously indicated, the various embodiments of the present invention are not limited to use in a multi-tap device, and may be incorporated into other electrical devices. In this manner, continuity of the main cable television cable connected to the illustrative multi-tap device is insured, regardless of whether the multi-tap cover 300 is installed on or removed from the housing 318.

Figure 30:
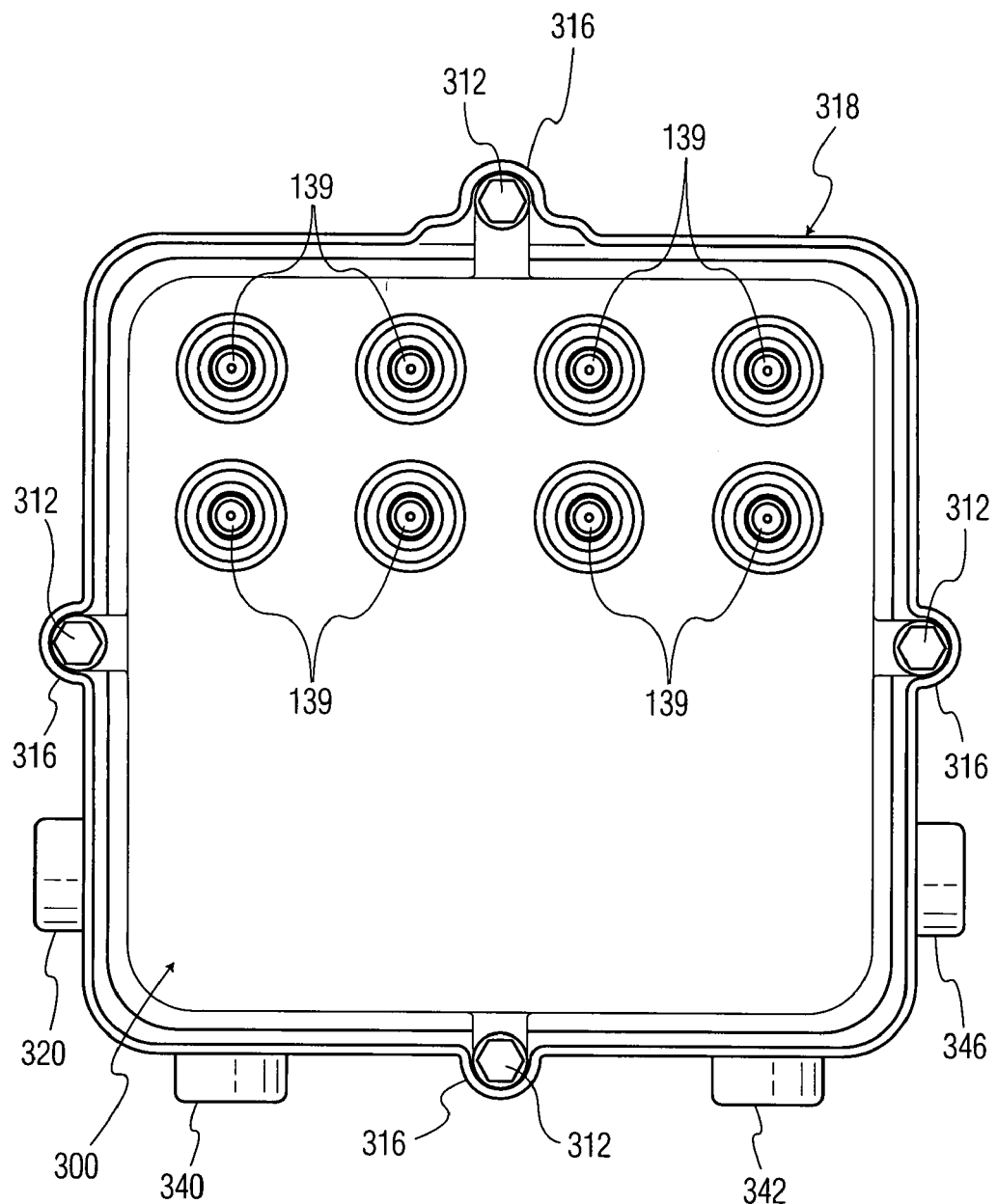
FIG. 30 shows a top view of a multi-tap device having eight 75 ohm F-type coaxial cable female output connectors for providing cable television signals and power for up to eight users, the device incorporating various embodiments of the present invention, as an illustrative example of the use of the present invention.

In FIG. 30, for purposes of illustration, a top view of a multi-tap device having eight 75 ohm F-type coaxial cable female output connectors 139 providing cable television signals and power to eight users, the device incorporating various embodiments of the present invention, as previously illustrated.

In other words, during normal operation, when the top housing cover plate 300 with its associated printed circuit board 292 is removed from the lower housing section 318, the spring assembly of the formerly compressed two springs 112 expand causing the plunger 2 to move upward, pulling the shorting bypass bar 82 upward, which in turn causes contact fingers 84 at each end of the latter to pass through holes 58 of cross member 50, to mechanically and electrically engage a bottom portion of their associated metal right-angle pin receptacle holders 36 for substantially simultaneously electrically connecting the end of the main cable installed within the associated aerial or pedestal input port 320, 340 of the multi-tap device to be electrically connected through the shorting bypass bar 82 to the end of the main cable 20 connected to the aerial or pedestal output port 346, 342 of the multi-tap device. The length of the male pin 38 of each of the pin receptacle holders 36 are made sufficiently long to insure they continue to make electrical contact with their associated female pin receptacles 200 on PCB 292 when the electrically conductive fingers 84 of shorting bypass bar 82 mechanically and electrically engage a portion of their associated pin receptacle holder 36, to insure make-before-break operation as plunger 2 is fully extended by removal of cover plate 300. In this manner, continuity of the signals and/or power being conducted by the main cable are not interrupted. Also, through use of the various embodiments of the invention for the design of the illustrated components thereof, signals up to and exceeding 3 GHz can either be bypassed or electrically processed by the multi-tap device of this example, without any distortion or attenuation of the high frequency signals via the present invention's maintaining a 75 ohm impedance for such signals, along with minimizing any capacitive or inductive coupling between the shorting bypass bar and the PCB connector assembly for maintaining the 75 ohm impedance.

Various embodiments of the present invention have been shown and described, but they are not meant to be limiting. For example, the various embodiments of the present invention are not meant to be limited to use in a multi-tap device, and can be utilized in numerous other devices that must process signals having frequencies as high or higher than 3 GHz. Also, those of skill in the art may recognize certain modifications to the various embodiments of the invention, which modifications are meant to be covered by the spirit and scope of the appended claims. For example, the male pin 38 of each of the right-angle pin receptacle holders 36 can be female pins, and the female pin receptacles 200 on the PCB 292 can be male pins, in an alternative embodiment of the invention.

What is claimed is:

1. A make-before-break mechanism for an electrical device handling both AC/DC and RF signals having frequencies ranging from 50 Hz to greater than 3 GHz, said device including a housing, at least one input port for receiving input signals from a main cable, at least one output port for outputting signals into the main cable for continuing the signal flow down the main cable line, a removable top cover plate for closing an open top of said housing, and electrical circuitry for operating said device being installed on a printed circuit board (PCB) mounted on a bottom portion of said cover plate, comprising:

a bypass switch assembly mounted in said housing including:
first means responsive to said cover plate in the process of being removed from said housing, for directly electrically connecting together the input and output ports of the device for passing RF signals received from the main cable directly back into the main cable;
second means responsive to said cover plate being installed on said housing for both electrically connecting said first means to an interior electrically conductive grounded bottom portion of said housing, and for electrically connecting input signals from said main cable at said input port to said electrical circuitry, and output signals from said electrical circuitry to said main cable at said output port, whenever said device is in an operative mode for processing signals received from the main cable; and
said first and second means being configured for insuring a 75 ohm impedance at all times between the main cable at the input port, and the main cable at the output port, for insuring passage of DC voltage and the integrity of RF signals having frequencies ranging from 50 Hz to at least 3 GHz at all times.

2. The mechanism of claim 1, wherein said first means of said bypass switch assembly further includes:
a first pin receptacle holder at said input port, said holder consisting of electrically conductive material, including both a first connector portion for receiving an electrical conductor carrying input signals from an end of said main cable, and a second connector portion for removably interconnecting with a mating electrically conductive input connector on said PCB;
a second pin receptacle holder at said output port, said holder consisting of electrically conductive material, including a first connector portion for electrically connecting output signals to an electrical conductor carrying output signals to a continuation end section of said main cable, and a second connector portion for removably plugging into an electrically conductive output connector on said PCB;
a shorting bypass bar consisting of electrically conductive material having a first end and an opposing second end each configured to have upwardly protruding first and second connector fingers, respectively; and
means responsive to the removal of said cover plate from said housing for moving said shorting bypass bar upward, thereby causing said first and second connector fingers to respectively come into electrical and mechanical contact with said first and second pin receptacle holders before the second connector portions of said first and second holders are totally removed from said input and output connectors on said PCB, respectively, for insuring the make-before-break flow of signals in said main cable upon the removal of said cover plate.

3. The mechanism of claim 2, wherein said second means of said bypass switch assembly further includes:
   a plurality of grounding fingers consisting of electrically conductive material, each being secured in spaced apart relation to a bottom portion of said shorting bypass bar, electrically conductive therewith, and downwardly protruding therefrom;
   said housing consisting of electrically conductive material; and
   means responsive to the installation of said cover plate onto said housing, for moving said shorting bypass bar downward, thereby causing said first and second connector fingers to respectively move downward away from said first and second pin receptacle holders, as said first and second pin receptacle holders begin to enter into and become electrically conductive with said input and output connectors on said PCB, respectively, and for causing said grounding fingers to mechanically and electrically contact opposing said electrically conductive grounded interior bottom portions of said housing as the second connector portions of said first and second pin receptacle holders are completely seated within said input and output connectors on said PCB.

4. The mechanism of claim 3, wherein said bypass switch assembly further includes:
   a cross member including a first end configured for retaining bottom portions of the first connector portion and second connector portion, respectively, of said first pin receptacle holder, and a second end configured for retaining portions of the first connector portion and second connector portion, respectively, of said second pin receptacle holder.

5. The mechanism of claim 4, wherein said bypass switch assembly further includes:
   a shorting bypass bar holder including first and second ends, and a top portion having both a first upwardly projecting guide pin at the first end, and a second upwardly projecting guide pin at the second end;
   said shorting bypass bar being secured to a bottom portion of said shorting bypass bar holder with said first and second connector fingers facing upward;
   said cross member further including:
      a through hole at each of its first and second ends for permitting said first and second connector fingers of said shorting bypass bar, respectively, to pass therethrough to mechanically and electrically contact said first and second pin receptacle holders, respectively;
      first and second guide pin posts each having centrally located through holes, proximate its first and second ends, respectively, for slideably receiving said first and second guide pins of said shorting bypass bar holder, respectively, to insure said holder and bypass bar move up and down parallel to the grounded interior portions of said housing; and
      the portion of said cross member located between and including said first and second guide pin posts being configured to be elevated above the bottom of said housing, for permitting said bar holder to move downward to move said first and second connector fingers away from respective said first and second pin receptacle holders, and to move said grounding fingers into contact with the bottom of said housing.

6. The mechanism of claim 5, further including:
   said cross member further including a centrally located through hole;
   an actuator plunger including a topmost cap portion for engaging an interior bottom portion of said top cover plate, and a centrally located circular shaft for slideably moving within and protruding through the centrally located through hole of said cross member, a bottom end of said shaft being rigidly secured to central portions of said bypass bar holder and said shorting bypass bar; and
   spring biasing means mounted on the shaft of said plunger, for causing said plunger to move upward upon removal of said cover plate from said housing, in turn both moving said first and second connector fingers into contact with said first and second pin receptacle holders, respectively, and moving said plurality of grounding fingers away from the bottom of said housing, and to cause opposite movement in response to installation of said cover plate onto said housing.

7. The mechanism of claim 5, wherein said spring biasing means includes:
   first and second compression springs mounted on the shaft of said plunger; and
   a washer consisting of non-metallic dielectric material mounted on the shaft of said plunger for separating said first and second springs, to provide reduced inductive and capacitive reactance relative to a single spring of the combined length of said first and second springs.

8. The mechanism of claim 4, further including:
   first and second top plastic covers configured for retaining top portions of said first and second pin receptacle holders, respectively, and for securement to the first and second ends of said cross members, respectively, for securely retaining said first and second pin receptacle holders.

9. The mechanism of claim 3, wherein each of said plurality of grounding fingers include:
   a flat bottom portion; and
   an extended top portion that projects upward from the bottom portion at an angle, and includes a downwardly curved free end or edge portion.

10. The mechanism of claim 2, wherein said bypass switch assembly further includes:
    a first pin guide consisting of electrically non-conductive material, secured within said input port, for retaining a portion of the first connector portion of said first pin receptacle holder; and
    a second pin guide consisting of electrically non-conductive material, secured within said second port, for retaining a portion of the first connector portion of said second pin receptacle holder.

11. The mechanism of claim 10, further including:
    first and second female pin receptacles each configured to removably fit within the first connector portions of said first and second pin receptacle holders, respectively, and each consisting of a single piece of electrically conductive metallic material.

12. The mechanism of claim 11, further including said first and second pin receptacle holders each being configured to minimize inductance and capacitance.

13. The mechanism of claim 11, wherein said first and second pin receptacle holders are each identically configured to minimize their inductive and capacitive reactances, and each includes:
    a male pin providing said second connector portion;

said first connector portion being provided by a female connector hollow shell having a back end portion at right-angles to said male pin, a ferrule being provided around the circumference of said shell inward from a front end portion thereof for snapping into a cylindrical portion of either of said first and second pin guides, an entry hole at the back end for receiving a front portion of either of said first and second female pin receptacles, the front end portion including a centrally located hole for receiving a male pin.

14. The mechanism of claim 13, where each of said first and second female pin receptacles includes:
   a circular rear portion;
   a reduced diameter portion following said rear portion;
   a relatively narrow circular converging portion following said reduced diameter portion;
   a narrow band-like portion following said converging portion;
   a striated downward converging portion following said band-like portion; and
   a striated circular front portion following said striated downward converging portion, having an entry hole for receiving a male pin.

15. The mechanism of claim 13, wherein said pin receptacle holders and the said female pin receptacles are configured to insure a secure mechanical and electrical connection therebetween.

16. The mechanism of claim 13, wherein said first and second pin guides each include:
   a round flange at a bottom end, said flange being configured for fitting securely within either one of said input and output ports;
   a cylindrical portion centrally located on said flange at a front end; and
   a through hole centrally located through said flange and cylindrical portion, the portion of the hole in said cylindrical portion being configured for securely receiving a front portion of said female connector hollow shell of a pin receptacle holder, the portion of the hole in said flange being configured for receiving a male pin.

17. The mechanism of claim 2, further including:
   first and second electromagnetic shields each having continuous circular band configurations, for surrounding and shielding said female input and output connectors, respectively, whereby said first and second electromagnetic shields are each secured to said PCB.

18. The mechanism of claim 17, wherein said first and second electromagnetic shields each consists of a single piece of Mu-metal material.

19. The mechanism of claim 2, further including:
   first and second isolating ground shields each configured to have a curved central portion, bottom mounting tabs for securement to said PCB, and end portions having grounding tabs for grounding said shields to said housing, said shields being positioned on said PCB to electromagnetically isolate said input and output connectors, respectively, from other components on said PCB.

20. The mechanism of claim 19, wherein said first and second isolating ground shields each consist of a single piece of Mu-metal material.

* * * * *